(12) United States Patent
Takeuchi et al.

(10) Patent No.: US 9,209,002 B2
(45) Date of Patent: Dec. 8, 2015

(54) GEIGER-MULLER COUNTER TUBE AND RADIATION MEASUREMENT APPARATUS

(71) Applicant: NIHON DEMPA KOGYO CO., LTD., Tokyo (JP)

(72) Inventors: Toshiaki Takeuchi, Saitama (JP); Kunio Hamaguchi, Saitama (JP); Kuichi Kubo, Saitama (JP); Kozo Ono, Saitama (JP); Noritoshi Kimura, Saitama (JP)

(73) Assignee: NIHON DEMPA KOGYO CO., LTD., Tokyo (JP)

( * ) Notice: Subject to any disclaimer, the term of this patent is extended or adjusted under 35 U.S.C. 154(b) by 0 days.

(21) Appl. No.: 14/559,928

(22) Filed: Dec. 4, 2014

(65) Prior Publication Data

US 2015/0155146 A1    Jun. 4, 2015

(30) Foreign Application Priority Data

Dec. 4, 2013  (JP) ................. 2013-251432
Dec. 17, 2013 (JP) ................. 2013-259691
Mar. 20, 2014 (JP) ................. 2014-058613
May 30, 2014  (JP) ................. 2014-111980

(51) Int. Cl.
| | |
|---|---|
| *H01J 47/00* | (2006.01) |
| *H01J 47/08* | (2006.01) |
| *G01T 1/18* | (2006.01) |
| *G01T 1/29* | (2006.01) |
| *G01T 1/185* | (2006.01) |

(52) U.S. Cl.
CPC . *H01J 47/08* (2013.01); *G01T 1/18* (2013.01); *G01T 1/185* (2013.01); *G01T 1/2935* (2013.01)

(58) Field of Classification Search
CPC ......... G01T 1/18; G01T 1/2935; G01T 1/285; H01J 47/08
See application file for complete search history.

(56) References Cited

U.S. PATENT DOCUMENTS 4,501,988 A * 2/1985 Mitrofanov et al. ............ 313/93

FOREIGN PATENT DOCUMENTS

JP      2007046999 A  *  2/2007
JP      2014-007086       1/2014

* cited by examiner

*Primary Examiner* — Kiho Kim
(74) *Attorney, Agent, or Firm* — Jianq Chyun IP Office

(57) ABSTRACT

A Geiger-Muller counter tube includes an enclosing tube, an anode conductor, a cathode conductor, an inert gas, and a quenching gas. The enclosing tube is at least partially cylindrical and has a sealed space. The anode conductor includes an anode electrode and a linear first metal lead portion. The anode electrode is arranged inside the space and formed in a rod shape. The first metal lead portion is connected to the anode electrode and supported at an end of the enclosing tube. The cathode conductor includes a cylindrical cathode electrode and a linear second metal lead portion. The cathode electrode surrounds a peripheral area of the anode electrode inside the space. The second metal lead portion is connected to the cathode electrode and supported at the end of the enclosing tube. The cathode electrode has a side surface through a part of which a through-hole passes.

14 Claims, 16 Drawing Sheets

GEIGER-MULLER COUNTER TUBE AND RADIATION MEASUREMENT APPARATUS

CROSS-REFERENCE TO RELATED APPLICATIONS

This application claims the priority benefit of Japan application serial no. 2013-251432 filed on Dec. 4, 2013, Japanese application serial no. 2013-259691 filed on Dec. 17, 2013, Japanese application serial no. 2014-58613 filed on Mar. 20, 2014, and Japanese application serial no. 2014-111980 filed on May 30, 2014. The entirety of each of the above-mentioned patent applications is hereby incorporated by reference herein and made a part of this specification.

TECHNICAL FIELD

This disclosure relates to a Geiger-Muller counter tube that includes a radiation detecting unit with a cylindrical cathode electrode, and this disclosure relates to a radiation measurement apparatus.

DESCRIPTION OF THE RELATED ART

A Geiger-Muller counter tube (GM counter tube) is a component that is mainly used in a radiation measurement apparatus. The GM counter tube includes electrodes formed as an anode and a cathode. In the GM counter tube, inert gas is enclosed. Additionally, between the anode electrode and the cathode electrode of the GM counter tube, a high voltage is applied in use. The radiation that enters into the inside of the GM counter tube ionizes the inert gas into an electron and an ion. The ionized electron and ion are accelerated toward the respective anode electrode and cathode electrode. This causes electrical conduction between the anode electrode and the cathode electrode so as to generate a pulse signal. For example, Japanese Unexamined Patent Application Publication No. 2014-7086 (hereinafter referred to as Patent Literature 1) discloses the Geiger-Muller counter tube where a pair of the anode electrode and the cathode electrode is formed.

However, inside of the GM counter tube of Patent Literature 1, the degree of uniformity of the gas was poor in some cases. Additionally, this caused the sensitivity of the GM counter tube to become unstable in some cases.

A need thus exists for a Geiger-Muller counter tube and a radiation measurement apparatus which are not susceptible to the drawback mentioned above.

SUMMARY

A Geiger-Muller counter tube according to a first aspect of the disclosure includes an enclosing tube, an anode conductor, a cathode conductor, an inert gas, and a quenching gas. The enclosing tube is at least partially cylindrical and has a sealed space. The anode conductor includes an anode electrode and a linear first metal lead portion. The anode electrode is arranged inside the space and formed in a rod shape. The first metal lead portion is connected to the anode electrode and supported at an end of the enclosing tube. The cathode conductor includes a cylindrical cathode electrode and a linear second metal lead portion. The cathode electrode surrounds a peripheral area of the anode electrode inside the space. The second metal lead portion is connected to the cathode electrode and supported at the end of the enclosing tube. The inert gas and the quenching gas are sealed inside the space. The cathode electrode has a side surface through a part of which a through-hole passes.

BRIEF DESCRIPTION OF THE DRAWINGS

The foregoing and additional features and characteristics of this disclosure will become more apparent from the following detailed description considered with reference to the accompanying drawings.

FIG. 10B is a schematic cross-sectional view of a Geiger-Muller counter tube 310a.

FIG. 11B is a schematic cross-sectional view of a Geiger-Muller counter tube 410a.

DETAILED DESCRIPTION

The embodiments of this disclosure will be described in detail below with reference to the attached drawings. It will be understood that the scope of the disclosure is not limited to the described embodiments, unless otherwise stated.

[Configuration of Geiger-Muller Counter 10 of First Embodiment]

Figure 1A:
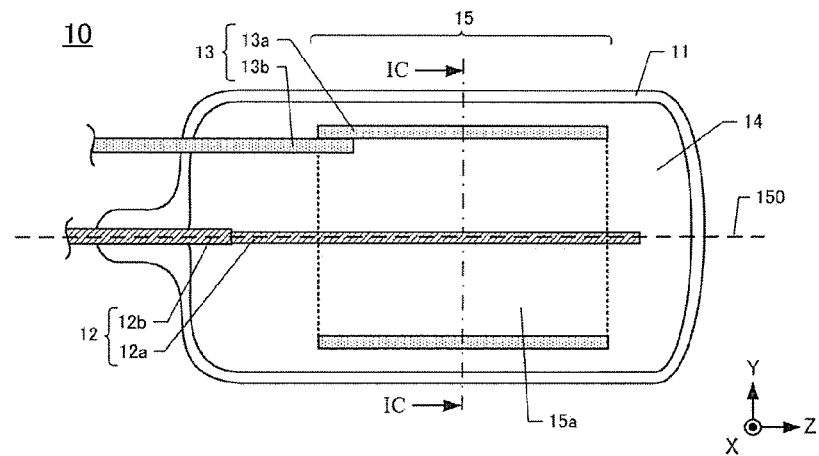
FIG. 1A is a cross-sectional view illustrating a Geiger-Muller counter tube 10.

FIG. 1A is a cross-sectional view illustrating the Geiger-Muller counter tube 10. The Geiger-Muller counter tube 10 is constituted of an enclosing tube 11, an anode conductor 12, and a cathode conductor 13. In the following description, assume that the extending direction of the enclosing tube 11 is the Z-axis direction, the diametrical direction of the enclosing tube 11, which is perpendicular to the Z-axis direction, is the X-axis direction. Similarly, assume that the diametrical direction of the enclosing tube 11, which is perpendicular to the X-axis direction and the Z-axis direction, is the Y-axis direction.

The enclosing tube 11 is, for example, formed of glass in a cylindrical shape. Both ends of the +Z-axis side and the −Z-axis side of the enclosing tube 11 is sealed, and a space 14 inside the enclosing tube 11 is sealed. The anode conductor 12 and the cathode conductor 13 pass through the end of the −Z-axis side of the enclosing tube 11.

The anode conductor 12 is constituted of an anode electrode 12a and a linear first metal lead portion 12b. The anode electrode 12a in a rod-shape is arranged in the space 14. The first metal lead portion 12b is connected to the anode electrode 12a and supported at an end of the enclosing tube 11. The first metal lead portion 12b is supported at an end of the −Z-axis side of the enclosing tube 11. The anode electrode 12a has an end at the −Z-axis side that is connected to the first metal lead portion 12b. Further, in the Geiger-Muller counter tube 10, the anode electrode 12a is arranged on one straight line 150 extending in the Z-axis direction.

The cathode conductor 13 includes a cylindrical cathode electrode 13a and a linear second metal lead portion 13b. The cathode electrode 13a surrounds a peripheral area of the anode electrode 12a in the space 14. The second metal lead portion 13b is connected to the cathode electrode 13a and is supported at an end of the enclosing tube 11. The second metal lead portion 13b is supported at the end of the −Z-axis side of the enclosing tube 11. The cathode electrode 13a has an end of the −Z-axis side that is connected to the Second Metal Lead Portion 13b.

A radiation detecting unit 15 that detects the radiation is constituted of the anode electrode 12a and the cathode electrode 13a that surrounds the anode electrode 12a. The radiation detecting unit 15 includes a space 15a that is the space to detect the radiation. The space 15a is a space that is surrounded by the cathode electrode 13a. The space 15a is a region that includes both the anode electrode 12a and the cathode electrode 13a inside a XY plane inside the space.

Figure 1B:
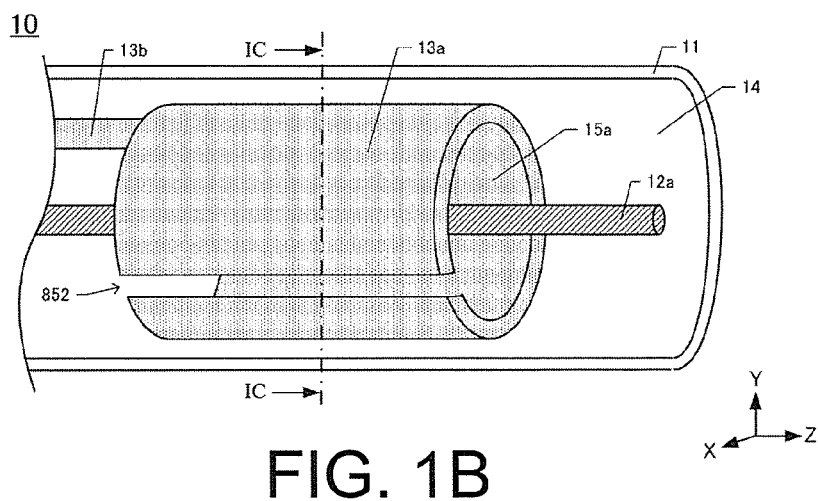
FIG. 1B is a schematic perspective view illustrating the Geiger-Muller counter tube 10.

FIG. 1B is a schematic perspective view illustrating the Geiger-Muller counter tube 10. The cathode electrode 13a is formed where a rectangular metal sheet is rolled into a cylindrical shape. The rectangular metal sheet is formed of, for example, metallic Kovar that is an alloy of iron, nickel, and cobalt or stainless steel. Further, the cathode electrode 13a is rolled in the shape where both end sides of the metal sheet are separated so as not to overlap the end sides each other. Thus, a slit 852 extending in the Z-axis direction is formed in the side surface of the cathode electrode 13a.

Figure 1C:
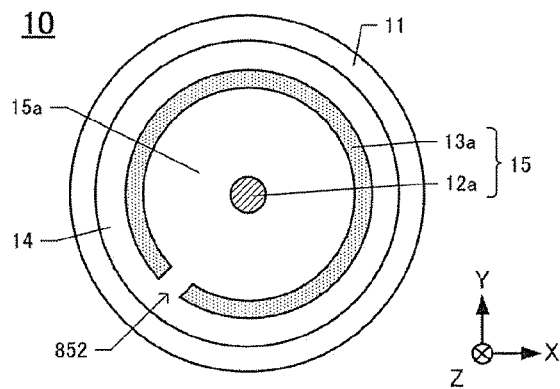
FIG. 1C is a cross-sectional view taken along the line IC-IC of FIG. 1A and FIG. 1B.

FIG. 1C is a cross-sectional view taken along the line IC-IC of FIG. 1A and FIG. 1B. The anode electrode 12a is arranged on the central axis of the cathode electrode 13a. That is, the central axis of the cathode electrode 13a is arranged on the straight line 150 (see FIG. 1A). Accordingly, when a voltage is applied between the cathode electrode 13a and the anode electrode 12a, inside the XY plane, the electric field of the space 15a surrounded by the cathode electrode 13a is formed with rotational symmetry around the anode electrode 12a. In addition, in the space 14 that includes the space 15a, an inert gas and a quenching gas are enclosed. The inert gas employs, for example, noble gas such as helium (He), neon (Ne), or argon (Ar). Additionally, the quenching gas employs, for example, halogen-based gas such as fluorine (F), bromine (Br) or chlorine (Cl).

In the Geiger-Muller counter tube 10, when the radiation enters into the space 15a via the enclosing tube 11, the radiation ionizes the inert gas into a positively charged ion and a negatively charged electron. Further, applying a voltage, for example, from 400V to 600V between the anode electrode 12a and the cathode electrode 13a forms an electric field in the space 15a. Accordingly, the ionized ion and electron are accelerated toward the respective cathode electrode 13a and anode electrode 12a. The accelerated ions collide with another inert gas so as to ionize the other inert gas. This repetition of ionizations forms ionized ions and electrons like an avalanche in the space 15a, thus causing a flow of a pulse current. A radiation measurement apparatus 20 (see FIG. 2) with the Geiger-Muller counter tube 10 can measure the number of pulses of a pulse signal due to this pulse current so as to measure the radiation dose. Additionally, when this current continuously flows, the number of pulses cannot be measured. In order to prevent this situation, the quenching gas is enclosed in the space 14 together with the inert gas. The quenching gas has an action for dispersing the energy of the ion.

In the conventional Geiger-Muller counter tube where the slit is not formed in the cathode electrode, the degree of vacuum is poor when the Geiger-Muller counter tube is drawn a vacuum in some cases. The poor degree of vacuum causes variations in the quality of the products in some cases. In addition, it takes time to inject the inert gas and the quenching gas into the Geiger-Muller counter tube after drawing a vacuum on the enclosing tube.

In the Geiger-Muller counter tube 10 with the slit 852 formed in the cathode electrode 13a, the slit 852 acts as a through-hole formed in the side surface of the cathode electrode 13a and ventilation of the gas inside and outside of the space 15a is improved. Thus, compared with the conventional Geiger-Muller counter tube, the inside of the enclosing tube 11 can be drawn a higher vacuum and the injection time of the gas can be shortened. Accordingly, the quality of the Geiger-Muller counter tube can be more stabilized and production times can be shortened.

Further, the slit formed in the cathode electrode increases detection sensitivity for the radiation thanks to the following reason. The flow of the gas is less likely to occur inside the enclosing tube where the gas is enclosed. Thus, it is very likely that the concentration difference of the inert gas or similar gases easily occur between the space 15a and the space outside of the space 15a in the radiation detecting unit 15 due to such as ionization of the inert gas by the radiation. Therefore, it is very likely that the slit 852 formed in the cathode electrode 13a in the Geiger-Muller counter tube 10 reduces the concentration difference.

[Configuration of Radiation Measurement Apparatus 20]

Figure 2:
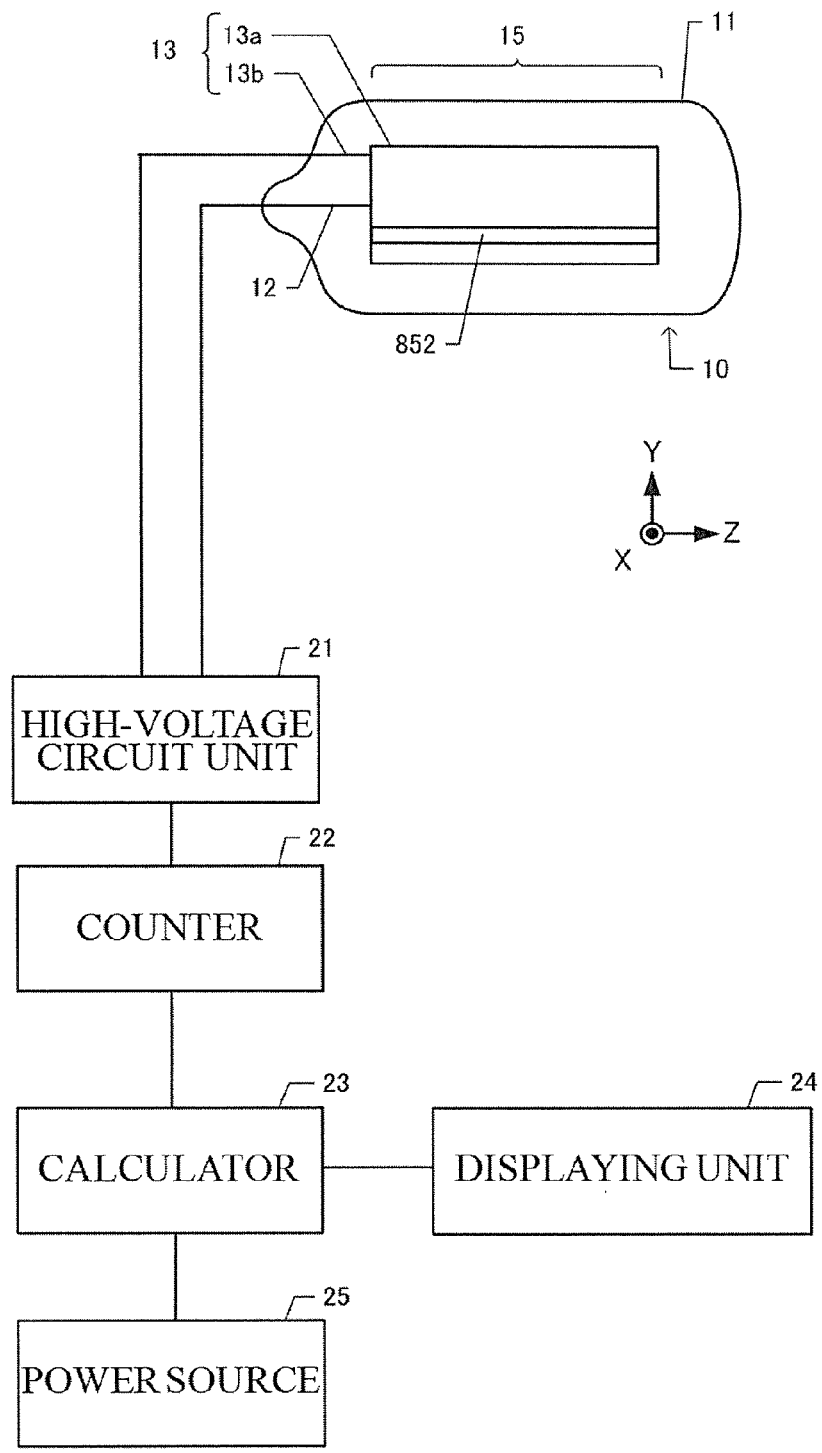
FIG. 2 is a schematic configuration diagram of a radiation measurement apparatus 20.

FIG. 2 is a schematic configuration diagram of the radiation measurement apparatus 20. The radiation measurement apparatus 20 is constituted including the Geiger-Muller counter tube 10. The anode conductor 12 and the cathode conductor 13 are connected to a high-voltage circuit unit 21 and a high voltage is applied between both conductors. The high-voltage circuit unit 21 is connected to a counter 22. The pulse signal detected by the radiation detecting unit 15 of the Geiger-Muller counter tube 10 is counted by the counter 22 and then converted into the radiation dose by a calculator 23. The converted radiation dose is displayed on a displaying unit 24. The calculator 23 connects to a power source 25 to receive the electric power.

[Second Embodiment]

In the Geiger-Muller counter tube 10, the slit 852 is formed in the side surface of the cathode electrode 13a that is formed in cylindrical shape. The slit 852 facilitates the movement of the gas inside and outside of the space 15a surrounded by the cathode electrode 13a. However, the through-hole different from the slit may be formed in the side surface of the cathode electrode. Furthermore, the cathode electrode 13a is formed in cylindrical shape; however, the cathode electrode may be formed in other shapes. The following description indicates the modifications of such Geiger-Muller counter tube. Like reference numerals designate corresponding or identical elements throughout the Geiger-Muller counter tube 10, and therefore such elements will not be further elaborated here.

[Configuration of Geiger-Muller Counter 30]

Figure 3A:
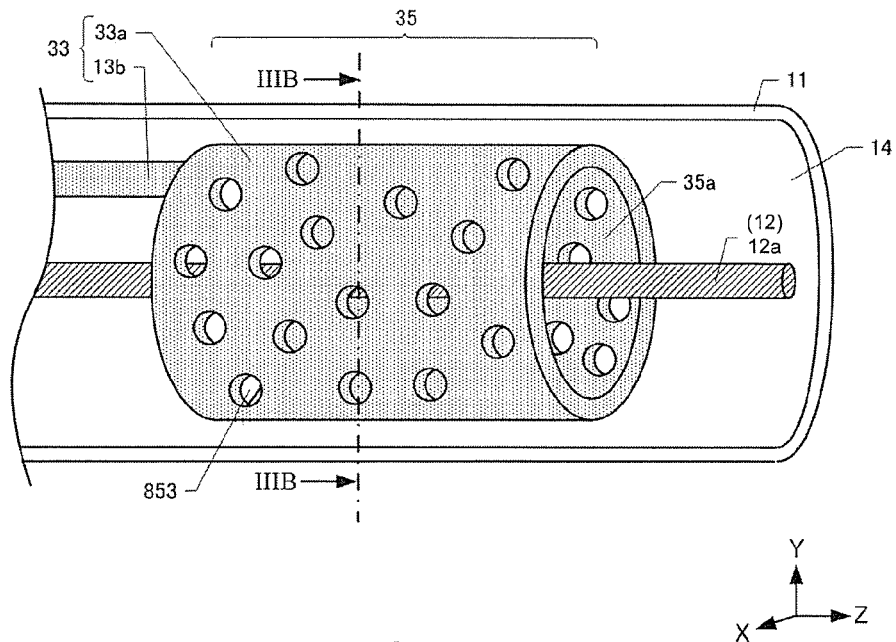
FIG. 3A is a schematic perspective view of a Geiger-Muller counter tube 30.

FIG. 3A is a schematic perspective view illustrating the Geiger-Muller counter tube 30. The Geiger-Muller counter tube 30 is constituted of the enclosing tube 11, the anode conductor 12, and a cathode conductor 33. Additionally, the cathode conductor 33 is constituted of a cylindrical cathode electrode 33a and the linear second metal lead portion 13b. The cathode electrode 33a surrounds the peripheral area of the anode electrode 12a in the space 14. The second metal lead portion 13b is connected to the cathode electrode 33a and is supported at the end of the enclosing tube 11. That is, the Geiger-Muller counter tube 30 is constituted by replacing the cathode electrode 13a of the Geiger-Muller counter tube 10 to the cathode electrode 33a.

The cathode electrode 33a has a cylindrical outer shape. In addition, in the Geiger-Muller counter tube 30, a radiation detecting unit 35 that detects the radiation is constituted of the anode electrode 12a and the cathode electrode 33a. The radiation detecting unit 35 includes a space 35a that is the space to detect the radiation. The space 35a is the space that is surrounded by the cathode electrode 33a. The space 35a is a region that includes both the anode electrode 12a and the cathode electrode 33a inside a XY plane inside the space.

In the side surface of the cathode electrode 33a, a plurality of through-holes 853 that pass through the side surface of the cathode electrode 33a are formed. The plurality of the through-holes 853 may be formed regularly or randomly in the side surface of the cathode electrode 33a. FIG. 3A illustrates the state where the plurality of the through-holes 853 are randomly formed. Further, the shape of each through-hole 853 is formed in a circular shape in FIG. 3A; however, the shape may be formed in various shapes such as an ellipse or a polygonal, not limited to the circular shape. Similar to the cathode electrode 13a, the cathode electrode 33a can be formed where a rectangular metal sheet is rolled into a cylindrical shape. The rectangular metal sheet is formed of, for example, metallic Kovar that is an alloy of iron, nickel, and cobalt or stainless steel. The plurality of the through-holes 853 is formed in the rectangular metal sheet.

Figure 3B:
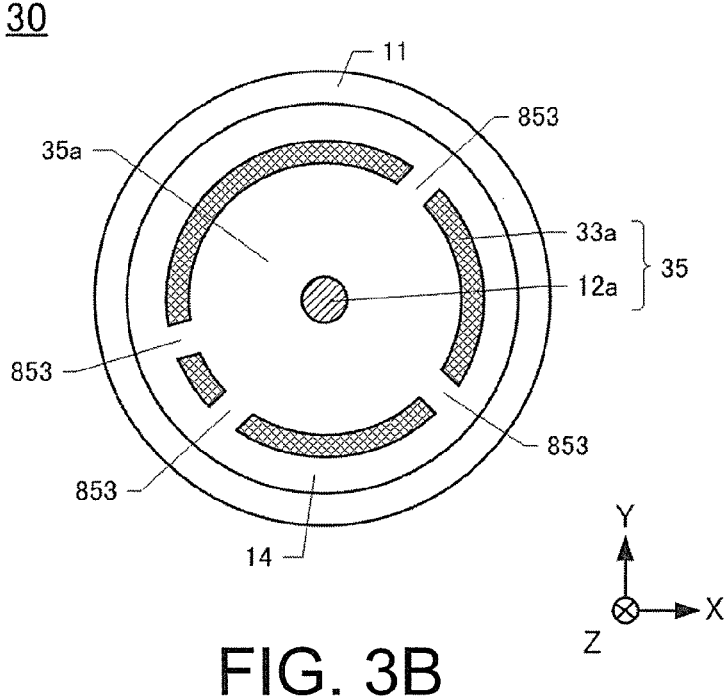
FIG. 3B is a cross-sectional view taken along the line IIIB-IIIB of FIG. 3A.

FIG. 3B is a cross-sectional view taken along the line IIIB-IIIB of FIG. 3A. The anode electrode 12a is arranged on the central axis of the cathode electrode 33a. Accordingly, when a voltage is applied between the cathode electrode 33a and the anode electrode 12a, inside the XY plane, the electric field of the space 35a surrounded by the cathode electrode 33a is formed with rotational symmetry around the anode electrode 12a. In addition, in the space 14 that includes the space 35a, an inert gas and a quenching gas are enclosed. In the Geiger-Muller counter tube 30, due to the formation of the plurality of the through-holes 853, the inert gas and the quenching gas is ensured to flow easily and freely inside and outside of the space 35a. Thus, the concentration difference of the inert gas and the quenching gas inside and outside of the space 35a can be reduced.

[Configuration of Geiger-Muller Counter 40]

Figure 4A:
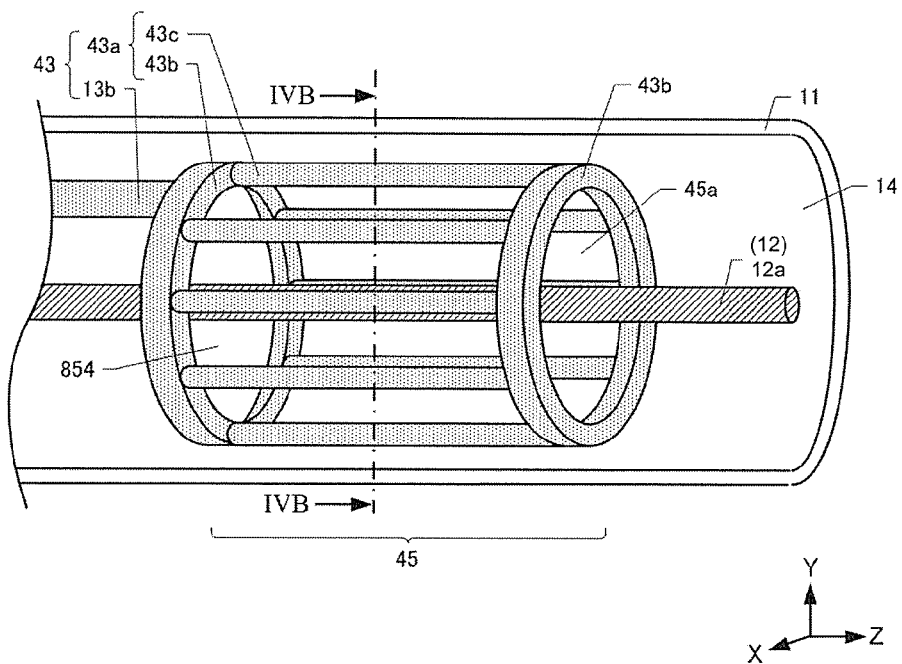
FIG. 4A is a schematic perspective view of a Geiger-Muller counter tube 40.

FIG. 4A is a schematic perspective view illustrating the Geiger-Muller counter tube 40 The Geiger-Muller counter tube 40 is constituted of the enclosing tube 11, the anode conductor 12, and a cathode conductor 43. Further, the cathode conductor 43 is constituted of a cylindrical cathode electrode 43a and the linear second metal lead portion 13b. The cathode electrode 43a surrounds the peripheral area of the anode electrode 12a in the space 14. The second metal lead portion 13b is connected to the cathode electrode 43a and is supported at the end of the enclosing tube 11. That is, the Geiger-Muller counter tube 40 is constituted by replacing the cathode electrode 13a of the Geiger-Muller counter tube 10 to the cathode electrode 43a.

The cathode electrode 43a has a cylindrical outer shape. In addition, in the Geiger-Muller counter tube 40, a radiation detecting unit 45 that detects the radiation is constituted of the anode electrode 12a and the cathode electrode 43a. The radiation detecting unit 45 includes a space 45a that is the space to detect the radiation. The space 45a is the space that is surrounded by the cathode electrode 43a and is the region that includes both the anode electrode 12a and the cathode electrode 43a inside a XY plane inside the space.

The cathode electrode 43a is constituted of a pair of metal frames 43b and a plurality of metal rods 43c. The pair of metal frames 43b are arranged facing each other in the Z-axis direction. The plurality of metal rods 43c are arranged so as to connect the pair of the metal frames 43b. In the cathode electrode 43a, each metal frame 43b is formed in a shape of a ring. The cathode electrode 43a is formed with eight metal rods 43c arranged at regular intervals around the peripheral area of each metal frame 43b. In addition, FIG. 4A illustrates the example formed of eight metal rods 43c; however, the number of the metal rod 43c is not limited to eight and it may be more than eight or less than eight. In the cathode electrode 13a (see FIG. 1B), the slit 852 is assumed to be the through-hole that passes through the side surface of the cathode electrode 13a. In the cathode electrode 33a (see FIG. 3A), the plurality of the through-holes 853 is the through-hole that passes through the side surface of the cathode electrode 33a. In the cathode electrode 43a, similarly, a gap of each metal rod 43c is a through-hole 854 that passes through the side surface of the cathode electrode 43a.

Figure 4B:
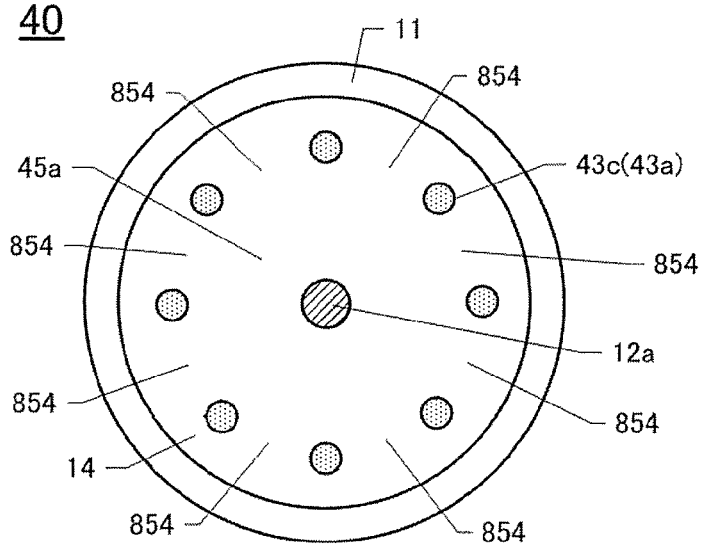
FIG. 4B is a cross-sectional view taken along the line IVB-IVB of FIG. 4A.

FIG. 4B is a cross-sectional view taken along the line IVB-IVB of FIG. 4A. The anode electrode 12a is arranged on the central axis of the cathode electrode 43a. Accordingly, when a voltage is applied between the cathode electrode 43a and the anode electrode 12a, inside the XY plane, the electric field of the space 45a surrounded by the cathode electrode 43a is formed with rotational symmetry around the anode electrode 12a. In addition, in the space 14 that includes the space 45a, an inert gas and a quenching gas are enclosed. In the Geiger-Muller counter tube 40, due to the formation of the plurality of the through-holes 854, the inert gas and the quenching gas is ensured to flow easily and freely inside and outside of the space 45a. Thus, the concentration difference of the inert gas and the quenching gas inside and outside of the space 45a can be reduced.

[Configuration of Geiger-Muller Counter 50]

Figure 5A:
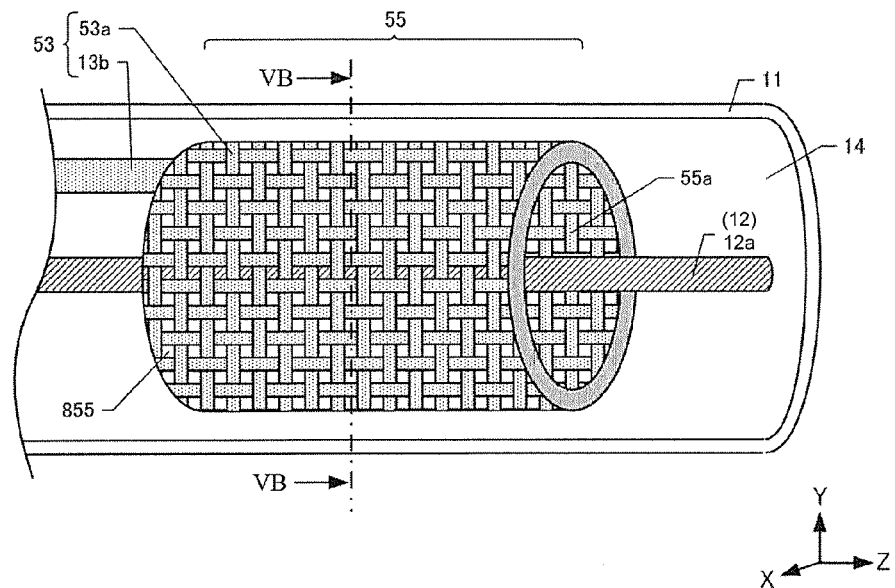
FIG. 5A is a schematic perspective view of a Geiger-Muller counter tube 50.

FIG. 5A is a schematic perspective view illustrating the Geiger-Muller counter tube 50. The Geiger-Muller counter tube 50 is constituted of the enclosing tube 11, the anode conductor 12, and a cathode conductor 53. Further, the cathode conductor 53 is constituted of a cylindrical cathode electrode 53a and the linear second metal lead portion 13b. The cathode electrode 53a surrounds the peripheral area of the anode electrode 12a in the space 14. The second metal lead portion 13b is connected to the cathode electrode 53a and is supported at the end of the enclosing tube 11. That is, the Geiger-Muller counter tube 50 is constituted by replacing the cathode electrode 13a of the Geiger-Muller counter tube 10 to the cathode electrode 53a.

The cathode electrode 53a has a cylindrical outer shape. In addition, in the Geiger-Muller counter tube 50, a radiation detecting unit 55 that detects the radiation is constituted of the anode electrode 12a and the cathode electrode 53a. The radiation detecting unit 55 includes a space 55a that is the space to detect the radiation. The space 55a is the space that is surrounded by the cathode electrode 53a and is a region that includes both the anode electrode 12a and the cathode electrode 53a inside a XY plane inside the space.

The cathode electrode 53a is formed where a mesh of metal that has a rectangular outer shape is rolled into a cylindrical shape. The mesh is formed by being tied and interwoven with metal wires into a grid pattern. The metal wire is formed of, for example, metallic Kovar that is an alloy of iron, nickel, and cobalt or stainless steel or similar material. The gap (mesh patterns) between the metal wires of the mesh is a through-hole 855 that passes through the cathode electrode 53a.

Figure 5B:
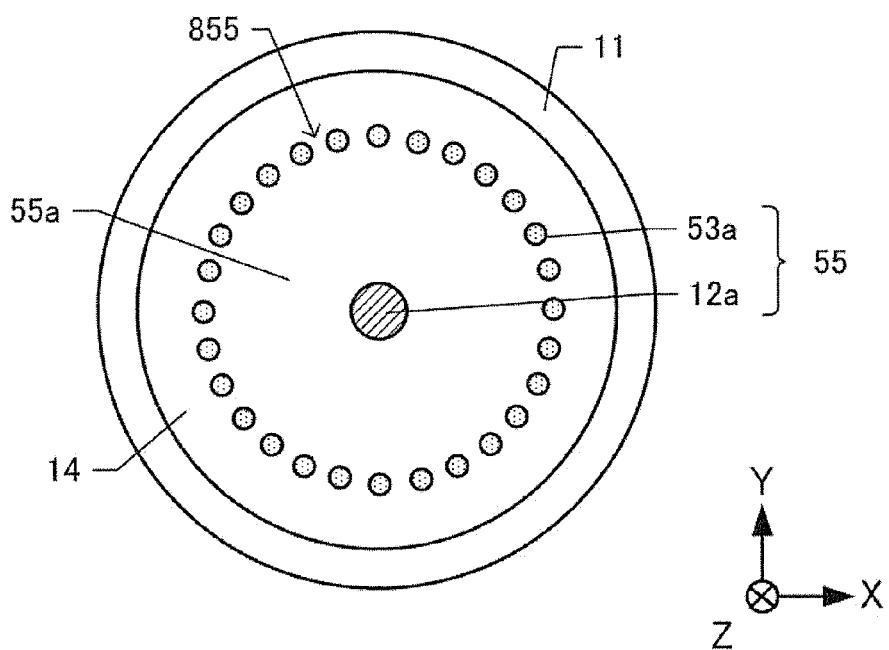
FIG. 5B is a cross-sectional view taken along the line VB-VB of FIG. 5A.

FIG. 5B is a cross-sectional view taken along the line VB-VB of FIG. 5A. The anode electrode 12a is arranged on the central axis of the cathode electrode 53a. Accordingly, when a voltage is applied between the cathode electrode 53a and the anode electrode 12a, inside the XY plane, the electric field of the space 55a surrounded by the cathode electrode 53a is formed with rotational symmetry around the anode electrode 12a. In addition, in the space 14 that includes the space 55a, an inert gas and a quenching gas are enclosed. In the Geiger-Muller counter tube 50, due to the formation of the plurality of the through-holes 855 in the cathode electrode 53a, the inert gas and the quenching gas are ensured to flow easily and freely inside and outside of the space 55a. Thus, the concentration difference of the inert gas and the quenching gas inside and outside of the space 55a can be reduced.

[Configuration of Geiger-Muller Counter 60]

Figure 6A:
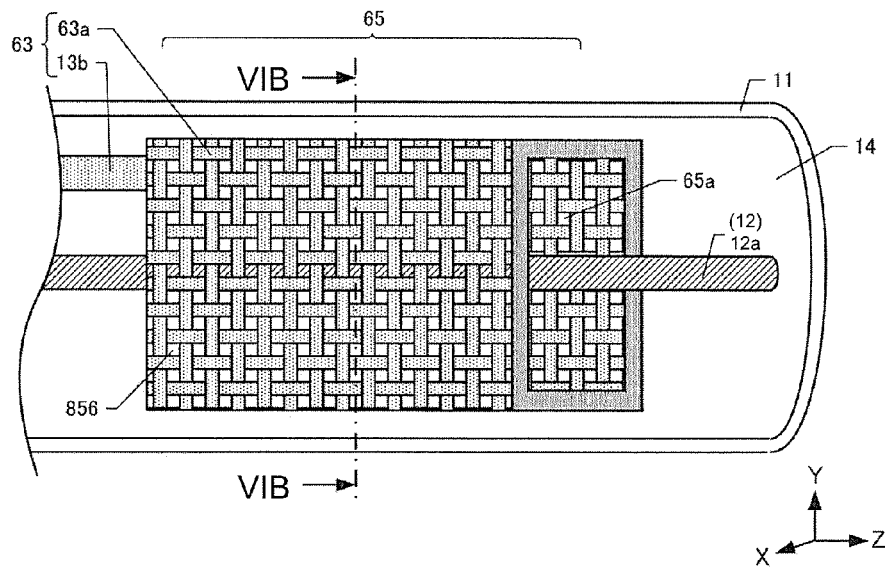
FIG. 6A is a schematic perspective view of a Geiger-Muller counter tube 60.

FIG. 6A is a schematic perspective view illustrating the Geiger-Muller counter tube 60. The Geiger-Muller counter tube 60 is constituted of the enclosing tube 11, the anode conductor 12, and a cathode conductor 63. Further, the cathode conductor 63 is constituted of a cylindrical cathode electrode 63a and the second metal lead portion 13b whose shape is linear. The cathode electrode 63a surrounds the peripheral area of the anode electrode 12a in the space 14. The second metal lead portion 13b is connected to the cathode electrode 63a and is supported at the end of the enclosing tube 11. That is, the Geiger-Muller counter tube 60 is constituted by replacing the cathode electrode 13a of the Geiger-Muller counter tube 10 to the cathode electrode 63a.

The cathode electrode 63a has a rectangular-cylindrical outer shape. In addition, in the Geiger-Muller counter tube 60, a radiation detecting unit 65 that detects the radiation is constituted of the anode electrode 12a and the cathode electrode 63a. The radiation detecting unit 65 includes a space 65a that is the space to detect the radiation. The space 65a is the space that is surrounded by the cathode electrode 63a and is a region that includes both the anode electrode 12a and the cathode electrode 63a inside a XY plane inside the space.

The cathode electrode 63a is formed where a mesh of metal that has a rectangular outer shape is rolled into a rectangular-cylindrical shape. The mesh is formed by being tied and interwoven with metal wires into a grid pattern. The metal wire is formed of, for example, metallic Kovar that is an alloy of iron, nickel, and cobalt or stainless steel or similar material. The gap between the metal wires of the mesh is a through-hole 856 that passes through the cathode electrode 63a.

Figure 6B:
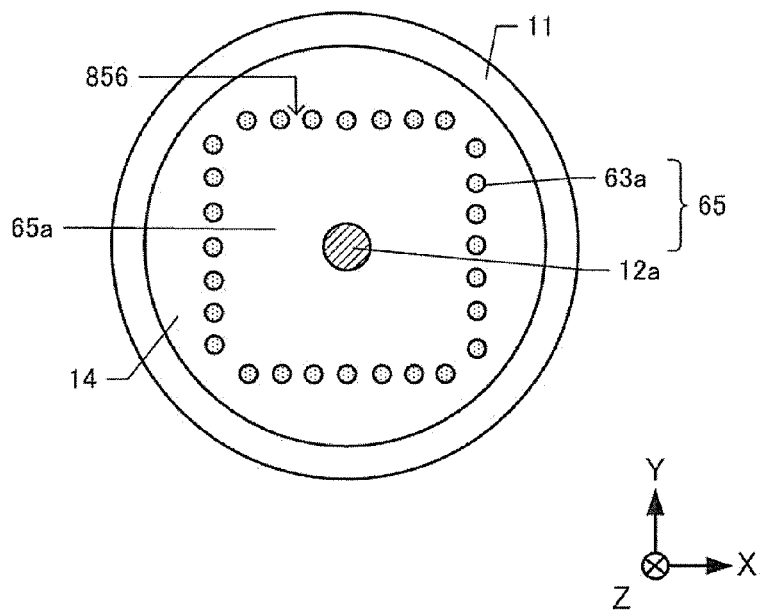
FIG. 6B is a cross-sectional view taken along the line VIB-VIB of FIG. 6A.

FIG. 6B is a cross-sectional view taken along the line VIB-VIB of FIG. 6A. The anode electrode 12a is arranged on the central axis of the cathode electrode 63a. Accordingly, when a voltage is applied between the cathode electrode 63a and the anode electrode 12a, inside the XY plane, the electric field of the space 65a surrounded by the cathode electrode 63a is formed with 4-fold symmetry around the anode electrode 12a. In addition, in the space 14 that includes the space 65a, an inert gas and a quenching gas are enclosed. In the Geiger-Muller counter tube 60, due to the formation of the plurality of the through-holes 856 in the cathode electrode 63a, the inert gas and the quenching gas is ensured to flow easily and freely inside and outside of the space 65a. Thus, the concentration difference of the inert gas and the quenching gas inside and outside of the space 65a can be reduced.

The cathode electrode 63a is formed in a rectangular-cylindrical shape; however, it may be formed in various shapes such as an elliptical-cylindrical shape or a polygonal-cylindrical shape. Furthermore, the cathode electrodes 13a, 33a, 43a may be formed in various shapes such as an elliptical-cylindrical shape or a polygonal-cylindrical shape.

[Third Embodiment]

Inside the enclosing tube, a plurality of (N number of: N is an integer of two or more) cathode electrodes (which are also referred to as plurality of cathode elements) or the anode electrodes (which are also referred to as anode elements) may be formed. The following description describes the example where the plurality of cathode electrodes or anode electrodes is formed inside the enclosing tube. Additionally, in the cathode electrode described below, it will be described that the slit 852 illustrated in FIG. 1B is formed to the cathode electrode. However, the other cathode electrodes, where the aforementioned through-hole is formed, may be employed: that is, the cathode electrode 33a (see FIG. 3A), the cathode electrode 43a (see FIG. 4A), or the cathode electrode 53a (see FIG. 5A). Further, the outer shape of the cathode electrode may be formed variously: that is, a rectangular cylindrical shape, an elliptical-cylindrical shape, a polygonal cylindrical shape or a similar shape.

[Configuration of Geiger-Muller Counter 110]

Figure 7A:
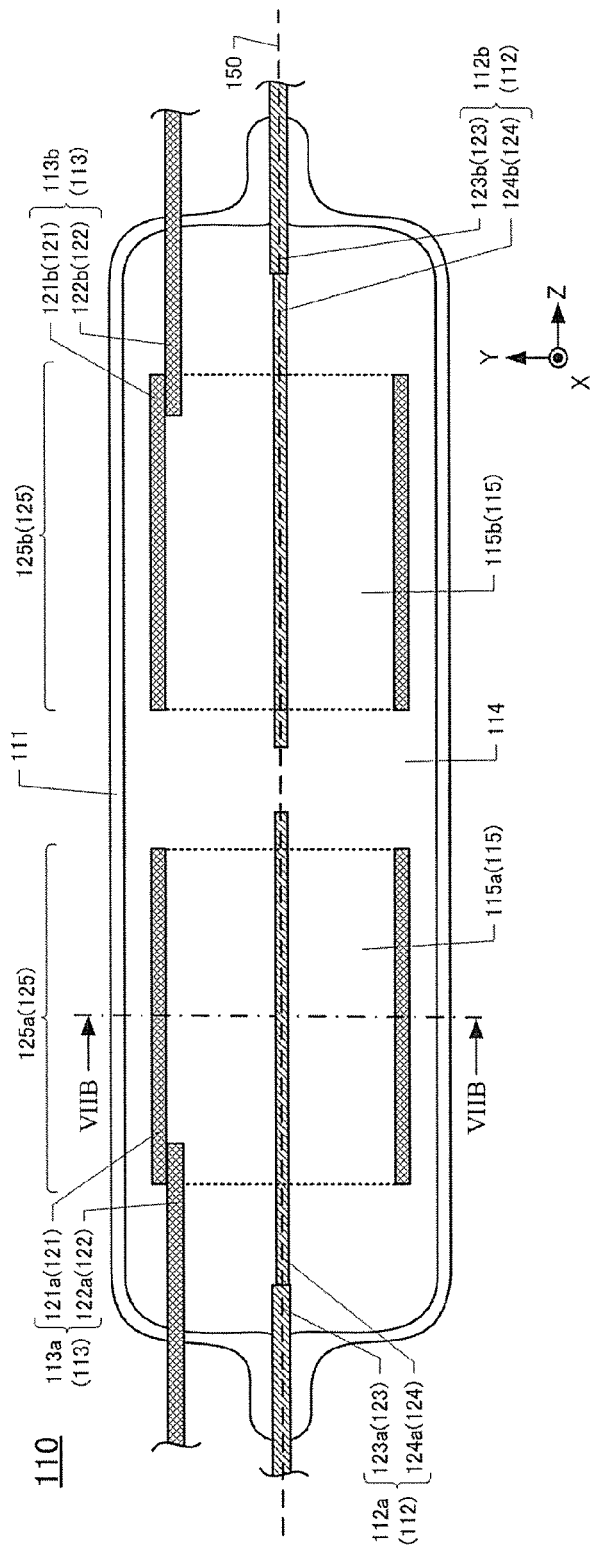
FIG. 7A is a cross-sectional view of a Geiger-Muller counter tube 110.

FIG. 7A is a cross-sectional view illustrating the Geiger-Muller counter tube 110. The Geiger-Muller counter tube 110 is constituted of an enclosing tube 111, an anode conductor 112, and a cathode conductor 113. In the following description, assume that the extending direction of the enclosing tube 111 is the Z-axis direction, the diametrical direction of the enclosing tube 111 that is perpendicular to the Z-axis direction is the X-axis direction. Similarly, assume that the diametrical direction of the enclosing tube 111 that is perpendicular to the X-axis direction and the Z-axis direction is the Y-axis direction.

The enclosing tube 111 is formed of glass in cylindrical shape. Both ends of the +Z-axis side and the -Z-axis side of the enclosing tube 111 is sealed and a space 114 inside the enclosing tube 111 is sealed. The anode conductor 112 and the cathode conductor 113 pass through both end of the +Z-axis side and -Z-axis side of the enclosing tube 111.

The anode conductor 112 is constituted of an anode electrode 124 and a linear first metal lead portion 123. The anode electrode 124 that is rod-shaped is arranged in the space 114. The first metal lead portion 123 is connected to the anode electrode 124 and supported at the end of the enclosing tube 111. In the Geiger-Muller counter tube 110, the anode conductor 112 is constituted of a first anode conductor 112a and a second anode conductor 112b. The first anode conductor 112a is arranged in the −Z-axis side in the space 114, and the second anode conductor 112b is arranged in the +Z-axis side in the space 114. Further, the first anode conductor 112a is constituted of an anode electrode 124a and a first metal lead portion 123a, and the second anode conductor 112b is constituted of an anode electrode 124b and a first metal lead portion 123b. The first metal lead portion 123a is supported at the end of −Z-axis side of the enclosing tube 111 and the first metal lead portion 123b is supported at the end of +Z-axis side of the enclosing tube 111. Additionally, in the Geiger-Muller counter tube 110, the anode electrode 124a and the anode electrode 124b are arranged on the straight line 150 that extends in the Z-axis direction.

The cathode conductor 113 is constituted of a cylindrical cathode electrode 121 and a linear second metal lead portion 122. The cathode electrode 121 surrounds the peripheral area of the anode electrode 124 in the space 114. The second metal lead portion 122 is connected to the cathode electrode 121 and is supported at the end of the enclosing tube 111. In the cathode electrode 121, for example, the slit 852 is formed as illustrated in FIG. 1B. In the Geiger-Muller counter tube 110, the cathode conductor 113 is constituted of a first cathode conductor 113a and a second cathode conductor 113b. The first cathode conductor 113a is arranged in the −Z-axis side in the space 114 and the second cathode conductor 113b is arranged in the +Z-axis side in the space 114. Further, the first cathode conductor 113a is constituted of a cathode electrode 121a and a second metal lead portion 122a and the second cathode conductor 113b is constituted of a cathode electrode 121b and a second metal lead portion 122b. The second metal lead portion 122a is supported at the end of −Z-axis side of the enclosing tube 111 and the second metal lead portion 122b is supported at the end of +Z-axis side of the enclosing tube 111.

A radiation detecting unit 125 that detects the radiation is constituted of the anode electrode 124 and the cathode electrode 121 that surrounds the anode electrode 124. In FIG. 7A, the radiation detecting unit 125 constituted of the anode electrode 124a and the cathode electrode 121a denotes a first radiation detecting unit 125a, and the radiation detecting unit 125 constituted of the anode electrode 124b and the cathode electrode 121b denotes a second radiation detecting unit 125b. In the Geiger-Muller counter tube 110, the radiation is detected at the first radiation detecting unit 125a and the second radiation detecting unit 125b respectively.

The radiation detecting unit 125 includes a space 115 that is the space to detect the radiation. The space 115 is the space that is surrounded by the cathode electrode 121 and is the region that includes both the anode electrode 124 and the cathode electrode 121 inside a XY plane inside the space. In FIG. 7A, the space 115 of the first radiation detecting unit 125a denotes a space 115a and the space 115 of the second radiation detecting unit 125b denotes a space 115b.

Figure 7B:
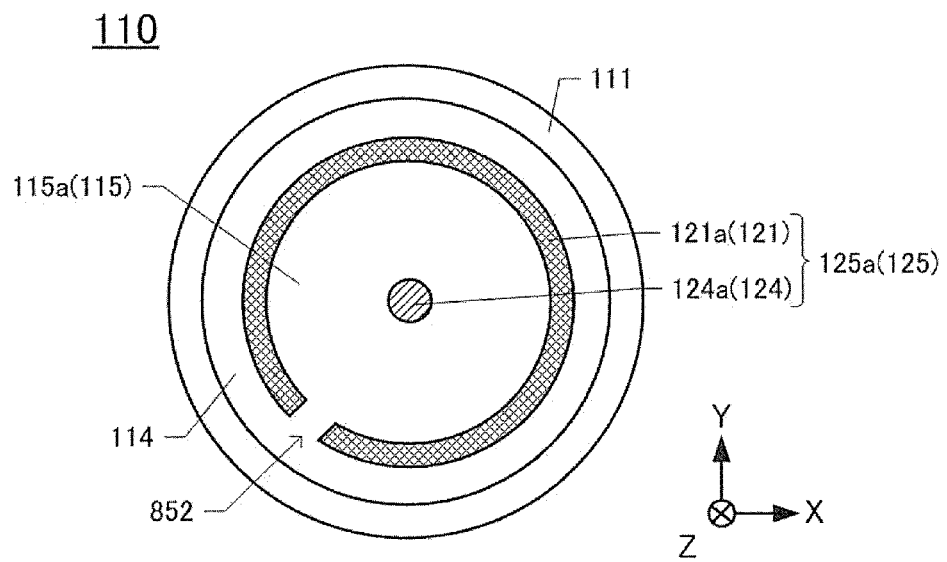
FIG. 7B is a cross-sectional view taken along the line VIIB-VIIB of FIG. 7A.

FIG. 7B is a cross-sectional view taken along the line VIIB-VIIB of FIG. 7A. The cathode electrode 121 is constituted of a cylindrical metal pipe. The metal pipe is formed of for example, metallic Kovar that is an alloy of iron, nickel, and cobalt or stainless steel. The anode electrode 124 is arranged on the central axis of the cathode electrode 121. That is, a central axis of the cathode electrode 121 is arranged on the straight line 150. Accordingly, when a voltage is applied between the anode electrode 124 and the cathode electrode 121, inside the XY plane, the electric field of the space 115 surrounded by the cathode electrode 121 is formed with rotational symmetry around the anode electrode 124. In addition, in the space 114 that includes the space 115, an inert gas and a quenching gas are enclosed. The inert gas employs, for example, noble gas such as helium (He), neon (Ne), or argon (Ar). In addition, the quenching gas employs, for example, halogen-based gas such as fluorine (F), bromine (Br) or chlorine (Cl).

In the Geiger-Muller counter tube 110, when the radiation enters into the space 115 via the enclosing tube 111, the radiation ionizes the inert gas into a positively charged ion and a negatively charged electron. Further, applying a voltage, for example, from 400V to 600V between the anode electrode 124 and the cathode electrode 121 forms an electric field within the space 115. Accordingly, the ionized ion and electron are accelerated toward the respective cathode electrode 121 and anode electrode 124. The accelerated ions collide with another inert gas so as to ionize the other inert gas. This repetition of ionizations forms ionized ions and electrons like the avalanche in the space 115, thus causing the flow of the pulse current. A radiation measurement apparatus 100 (see FIG. 8) with the Geiger-Muller counter tube 110 can measure the number of pulses of the pulse signal due to this pulse current so as to measure the radiation dose. Additionally, when this current continuously flows, the number of pulses cannot be measured. In order to prevent this situation, the quenching gas is enclosed within the space 114 together with the inert gas. The quenching gas has an action for dispersing the energy of the ion.

In the Geiger-Muller counter tube, the radiation that enters into the space 115 is measured and thus, the detection sensitivity for the radiation can be increased by forming the space 115 larger. However, when the space 115 is formed larger by lengthening the anode electrode 124 and the cathode electrode 121, the fixed strength of the anode electrode 124 and the cathode electrode 121 in the space 115 is weakened. Therefore, the Geiger-Muller counter tube becomes susceptible to impact.

In the Geiger-Muller counter tube 110, the size of the space 115 is formed larger by forming the two sets of the respective pairs of the anode electrodes 124 and cathode electrodes 121 in the space 114. Further, each anode electrode 124 and cathode electrode 121 is secured at the −Z-axis side or the +Z-axis side of the Geiger-Muller counter tube 110. Therefore, the fixed strength of the anode electrode 124 and the cathode electrode 121 in the space 114 is increased. Thus, the impact resistance of the Geiger-Muller counter tube 110 is improved.

Figure 7C:
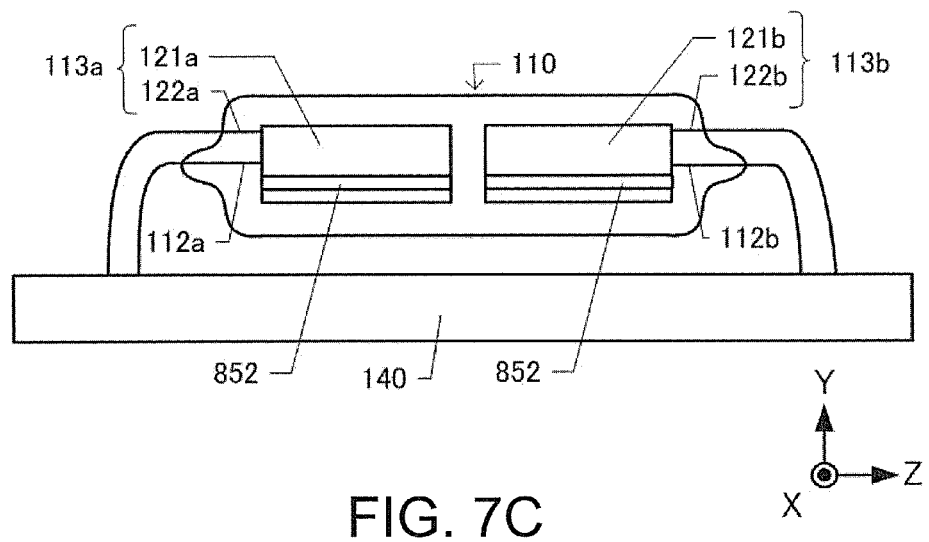
FIG. 7C is a schematic side view illustrating the Geiger-Muller counter tube 110 mounted on a substrate.

FIG. 7C is a schematic side view illustrating the Geiger-Muller counter tube 110 mounted on a substrate 140. The Geiger-Muller counter tube 110 is used by being fixed to the substrate 140. In the conventional Geiger-Muller counter tube, electrodes are led out only from one end of the enclosing tube and only one end of the Geiger-Muller counter tube is secured to the substrate or a similar part. In contrast to this, in the Geiger-Muller counter tube 110, the electrodes are led out from both ends of the enclosing tube 111. As illustrated in FIG. 7C, the Geiger-Muller counter tube 110 is secured to the substrate 140 at both ends of the +Z-axis side and the −Z-axis side of the Geiger-Muller counter tube 110. Therefore, the Geiger-Muller counter tube 110 can firmly and stably be secured to the substrate or a similar part compared to the conventional Geiger-Muller counter tubes.

In addition, in the Geiger-Muller counter tube 110, the measurement is performed in the state where the inert gas and the quenching gas are sealed in the space 114 and are not circulated. Therefore, the state in the space 114 is stabilized and the detection sensitivity of the radiations can be kept stable.

Furthermore, when using a plurality of Geiger-Muller counter tubes for the purpose such as increasing the detection sensitivity for the radiation, due to the individual difference of the detection sensitivity of each of the Geiger-Muller counter tubes, the accuracy of radiation detection may be lowered in some cases. In the Geiger-Muller counter tube 110, two sets of the radiation detecting unit 125 are arranged in one Geiger-Muller counter tube, and the inert gas and the quenching gas are commonly used. Accordingly, the ratio of the inert gas and the quenching gas inside the Geiger-Muller counter tube 110 is the same. Therefore, in the Geiger-Muller counter tube 110, the accuracy of radiation detection can be increased compared to using two sets of the Geiger-Muller counter tubes.

[Configuration of Radiation Measurement Apparatus 100]

Figure 8:
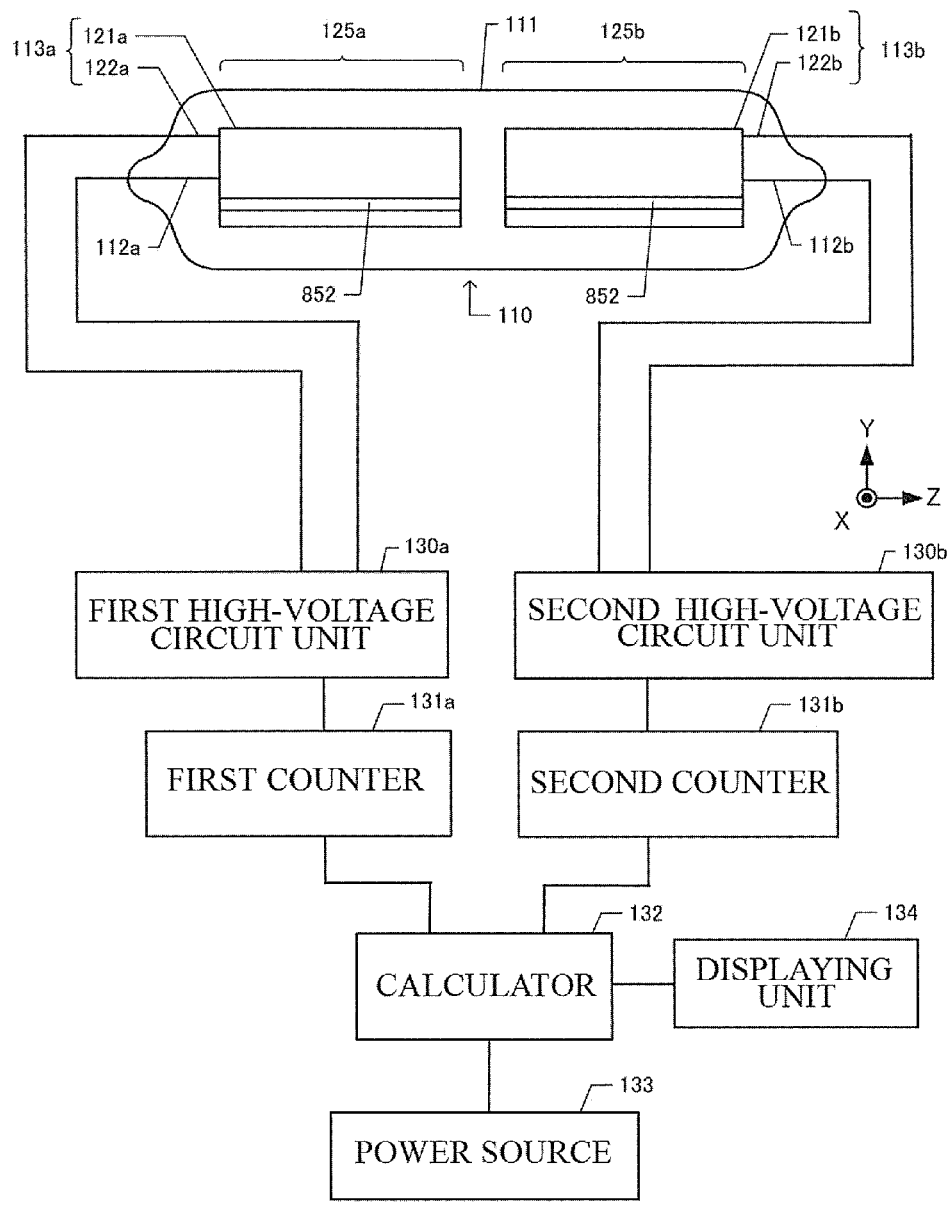
FIG. 8 is a schematic configuration diagram of a radiation measurement apparatus 100.

FIG. 8 is a schematic configuration diagram of the radiation measurement apparatus 100. The radiation measurement apparatus 100 is constituted including the Geiger-Muller counter tube 110. The first anode conductor 112a and the first cathode conductor 113a are connected to a first high-voltage circuit unit 130a and a high voltage is applied between both conductors. Further, the second anode conductor 112b and the second cathode conductor 113b are connected to a second high-voltage circuit unit 130b and a high voltage is applied between both conductors. The first high-voltage circuit unit 130a is connected to a first counter 131a and the second high-voltage circuit unit 130b is connected to a second counter 131b. The pulse signal detected by the first radiation detecting unit 125a and the second radiation detecting unit 125b of the Geiger-Muller counter tube 110 is counted by the first counter 131a and the second counter 131b and then converted into the radiation dose by a calculator 132. The converted radiation dose is displayed on a displaying unit 134. The calculator 132 connects to a power source 133 to receive the electric power.

In FIG. 8, the first radiation detecting unit 125a and the second radiation detecting unit 125b are respectively connected to the different high-voltage circuit unit and the counter and detect the radiation dose individually. However, the first radiation detecting unit 125a and the second radiation detecting unit 125b may be connected in parallel to one high-voltage circuit unit and one counter. Thus, the first radiation detecting unit 125a and the second radiation detecting unit 125b may detect the radiation dose as a whole.

[Fourth Embodiment]

The radiation dose detected by the Geiger-Muller counter tube 110 is measured as the total value of the radiation dose of both β-ray and γ-ray. On the other hand, it is required to measure each radiation dose of β-ray and γ-ray in some cases. The following description describes a Geiger-Muller counter tube 210 and a radiation measurement apparatus 200 to measure each radiation dose of β-ray and γ-ray. Additionally, like reference numerals designate corresponding or identical elements throughout the third embodiment, and therefore such elements will not be further elaborated here

[Configuration of Geiger-Muller Counter 210]

Figure 9A:
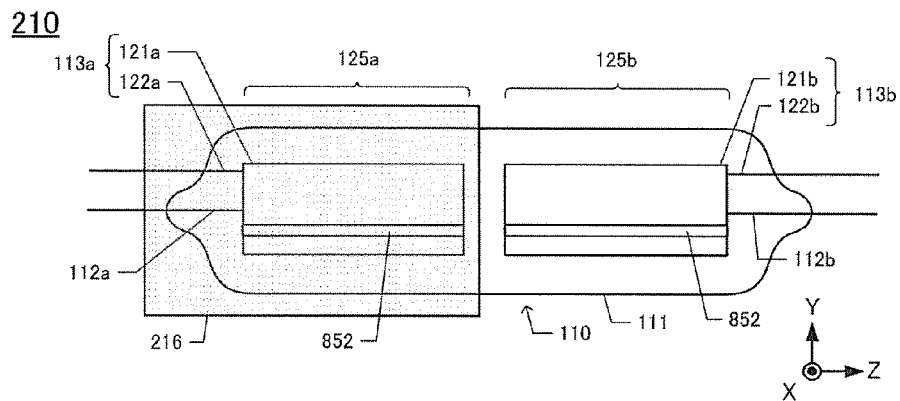
FIG. 9A is a schematic configuration diagram of a Geiger-Muller counter tube 210.

FIG. 9A is a schematic configuration diagram of the Geiger-Muller counter tube 210 The Geiger-Muller counter tube 210 is formed in the state where a shielding portion 216 is mounted to the first radiation detecting unit 125a of the Geiger-Muller counter tube 110. The shielding portion 216 blocks β-ray by surrounding the enclosing tube 111 from the outside. The shielding portion 216 can be, for example, formed as a cylindrical tube of aluminum.

In the Geiger-Muller counter tube 210, the second radiation detecting unit 125b, which is not covered by the shielding portion 216, can detect β-ray and γ-ray. In addition, the first radiation detecting unit 125a, which is covered with the shielding portion 216, can detect only γ-ray because β-ray is blocked by the shielding portion 216. The radiation dose of β-ray can be obtained by subtracting the radiation dose of the first radiation detecting unit 125a from the radiation dose of the second radiation detecting unit 125b.

Conventionally, two Geiger-Muller counter tubes are prepared when measuring β-ray and γ-ray simultaneously. One Geiger-Muller counter tube is put into a tube such as an aluminum tube to block β-ray and measures only γ-ray. In addition, the other Geiger-Muller counter tube measures β-ray and γ-ray. Then, β-ray is obtained by subtracting the radiation dose of the one Geiger-Muller counter tube from the radiation dose of the other Geiger-Muller counter tube.

In contrast to this, in the Geiger-Muller counter tube 210, both the radiation dose of β-ray and γ-ray can be measured simultaneously with one Geiger-Muller counter tube. Therefore, it is possible to save a labor to prepare a plurality of Geiger-Muller counter tubes and thus, the measurement is facilitated. Furthermore, similar to the Geiger-Muller counter tube 110, the inert gas and the quenching gas are commonly used in the first radiation detecting unit 125a and the second radiation detecting unit 125b. Therefore, the accuracy of radiation detection can be increased compared to using two sets of the Geiger-Muller counter tubes.

[Configuration of Radiation Measurement Apparatus 200]

Figure 9B:
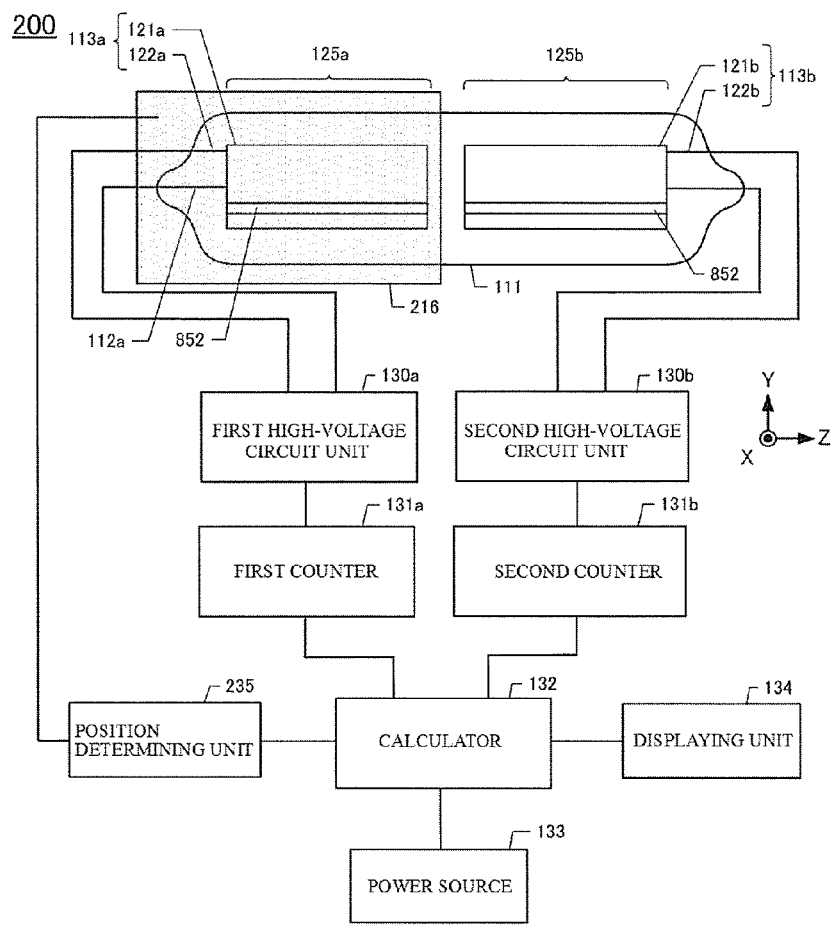
FIG. 9B is a schematic configuration diagram of a radiation measurement apparatus 200.

FIG. 9B is a schematic configuration diagram of the radiation measurement apparatus 200. In the radiation measurement apparatus 200, the Geiger-Muller counter tube 210 is employed instead of the Geiger-Muller counter tube 110 in the radiation measurement apparatus 100 illustrated in FIG. 8. Further, the radiation measurement apparatus 200 includes a position determining unit 235 for determining the position of the shielding portion 216. In the state illustrated in FIG. 9B, the radiation dose of only γ-ray is detected at the first counter 131a that is connected to the first radiation detecting unit 125a blocked by the shielding portion 216. Additionally, the radiation dose of γ-ray and β-ray are detected at the second counter 131b that is connected to the second radiation detecting unit 125b. Therefore, in the radiation measurement apparatus 200, the radiation dose of γ-ray can be detected by the radiation dose of the first radiation detecting unit 125a. Further, the radiation dose of β-ray can be detected by subtracting the radiation dose of the first radiation detecting unit 125a from the radiation dose of the second radiation detecting unit 125b. These calculations are performed at the calculator 132, and further, the result can be displayed on the displaying unit 134.

In addition, in the radiation measurement apparatus 200, the shielding portion 216 is formed so as to be able to freely remove from and mount to the first radiation detecting unit 125a. For example, when the shielding portion 216 is moved to the −Z-axis direction from the state of FIG. 9B, the first radiation detecting unit 125a becomes exposed. Then, the first radiation detecting unit 125a and the second radiation detecting unit 125b can perform measurement in the same condition. When the measurement is performed in this state, it is possible to perform proofread of the detected value of the radiation dose between the first radiation detecting unit 125a and the second radiation detecting unit 125b or a similar operation.

Furthermore, in the shielding portion 216, for example, a sensor (not illustrated), which senses whether the shielding portion 216 is removed from or mounted to the Geiger-Muller counter tube 210, may be included. Thus, removal/mounting of the shielding portion 216 may be determined automatically. The sensor is connected to the position determining unit 235 that determines the position of the shielding portion 216, and the position determining unit 235 is connected to the calculator 132. In the calculator 132, when the position determining unit 235 determines that the shielding portion 216 is mounted to the Geiger-Muller counter tube 210, γ-ray is detected by the first radiation detecting unit 125a. Then, the calculator 132 automatically detects β-ray by subtracting the radiation dose of the first radiation detecting unit 125a from that of the second radiation detecting unit 125b. Furthermore, when the position determining unit 235 determines that the shielding portion 216 is removed from the Geiger-Muller counter tube 210, the radiation doses of the first radiation detecting unit 125a and the second radiation detecting unit 125b are displayed on the displaying unit 134. In the display on the displaying unit 134, an arithmetic mean of the radiation doses of the first radiation detecting unit 125a and the second radiation detecting unit 125b may be displayed.

[Fifth Embodiment]

In the Geiger-Muller counter tube, only either one of the cathode conductor or the anode conductor may be formed in two sets. The following description describes the Geiger-Muller counter tube where only either one of the cathode conductor or the anode conductor is formed in two sets. Additionally, like reference numerals designate corresponding or identical elements throughout the third embodiment and the fourth embodiment, and therefore such elements will not be further elaborated here.

[Configuration of Geiger-Muller Counter 310]

Figure 10A:
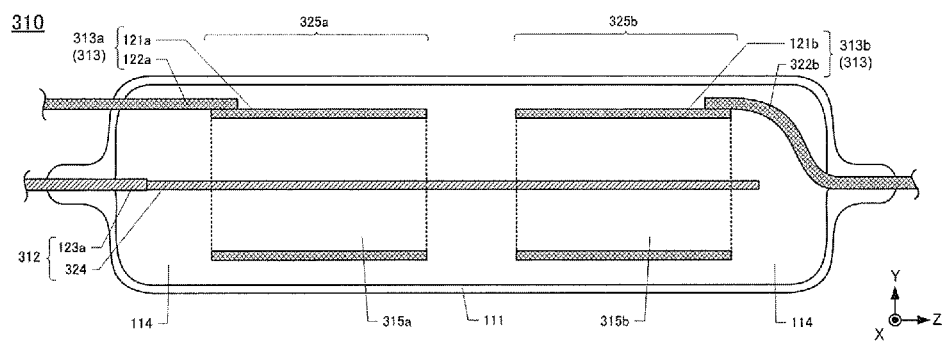
FIG. 10A is a cross-sectional view of a Geiger-Muller counter tube 310.

FIG. 10A is a cross-sectional view illustrating the Geiger-Muller counter tube 310. The Geiger-Muller counter tube 310 is constituted of the enclosing tube 111, an anode conductor 312, and a cathode conductor 313.

The anode conductor 312 is constituted of an anode electrode 324 and the linear first metal lead portion 123a. The anode electrode 324 is arranged in the space 114. The first metal lead portion 123a is connected to the anode electrode 324 and supported at the end of the −Z-axis side the enclosing tube 111. The end of the −Z-axis side of the anode electrode 324 is connected to the first metal lead portion 123a. The end of the +Z-axis side of the anode electrode 324 extends in the Z-axis direction up to near the end of the +Z-axis side in the space 114.

The cathode conductor 313 is constituted of a first cathode conductor 313a that is arranged in the −Z-axis side in the space 114 and a second cathode conductor 313b that is arranged in the +Z-axis side in the space 114. The first cathode conductor 313a is constituted of the cathode electrode 121a and the second metal lead portion 122a, and the second metal lead portion 122a is bonded on the outer surface of the cathode electrode 121a. The second cathode conductor 313b is constituted of the cathode electrode 121b and a second metal lead portion 322b, and the second metal lead portion 322b is bonded on the outer surface of the cathode electrode 121b. Further, the second metal lead portion 322b is supported at the center of the end of the +Z-axis side of the enclosing tube 111.

In the Geiger-Muller counter tube 310, a first radiation detecting unit 325a is constituted of the cathode electrode 121a and the anode electrode 324, and a second radiation detecting unit 325b is constituted of the cathode electrode 121b and the anode electrode 324. The first radiation detecting unit 325a includes a space 315a that detects the radiation and the second radiation detecting unit 325b includes a space 315b that detects the radiation.

In the anode electrode 324, the ionized electrons, which are generated at the first radiation detecting unit 325a and the second radiation detecting unit 325b, are detected. Accordingly, by measuring the pulse signals detected at the anode electrode 324, the total radiation dose of β-ray and γ-ray, which are detected at the first radiation detecting unit 325a and the second radiation detecting unit 325b, can be measured.

In each radiation detecting unit, the ionized ions receive the electrons in the cathode electrode 121 and the pulse current flows to the cathode electrode 121. The radiation dose can be measured by measuring this pulse current. In the cathode electrode 121a and the cathode electrode 121b, the respective total radiation doses of β-ray and γ-ray is measured at the first radiation detecting unit 325a and the second radiation detecting unit 325b.

In the Geiger-Muller counter tube 310, the whole radiation dose of the first radiation detecting unit 325a and the second radiation detecting unit 325b is measured by the anode electrode 324. Further, at the same time, the radiation dose of the first radiation detecting unit 325a and the second radiation detecting unit 325b can be individually measured by each cathode electrode. Additionally, in the Geiger-Muller counter tube 310, despite the capability of performing such individual measurement, assembly of the Geiger-Muller counter tube 310 is facilitated because the usage of the anode electrode 324 is one.

Further, in the cathode conductor 313, the second metal lead portion 122a and the second metal lead portion 322b are bonded on the outer surfaces of the cathode electrode 121a and the cathode electrode 121b respectively. Therefore, the gap between the anode electrode and the cathode electrode is constant at any position in the space 315a and the space 315b where the radiation is detected. Accordingly, unevenness of the discharge conditions in the space 315a and the space 315b is eliminated and more accurate measurement can be performed. In addition, the configuration such as bonding the metal lead portion on the outer surface of the cathode electrode may be employed to the aforementioned Geiger-Muller counter tube 110 and the Geiger-Muller counter tube 410 described below or similar Geiger-Muller counter tubes.

[Configuration of Geiger-Muller Counter 310a]

Figure 10B:
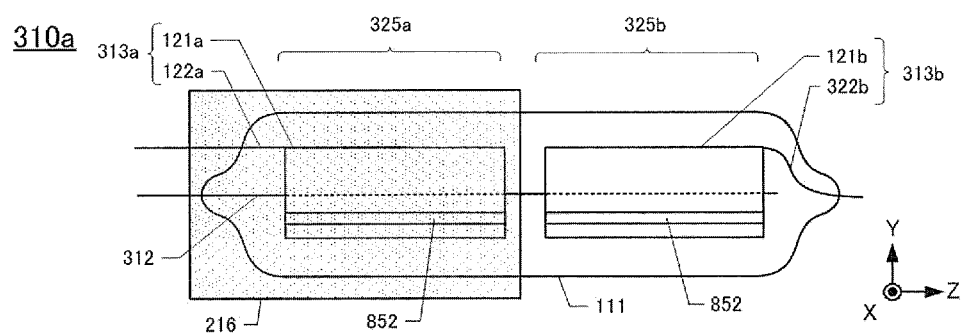

FIG. 10B is a schematic a cross-sectional view illustrating the Geiger-Muller counter tube 310a. The Geiger-Muller counter tube 310a is constituted of the Geiger-Muller counter tube 310 and the shielding portion 216 that covers the first radiation detecting unit 325a of the Geiger-Muller counter tube 310.

In the first radiation detecting unit 325a, only γ-ray is detected. Therefore, the radiation dose of γ-ray can be detected by measuring the pulse signal observed at the cathode electrode 121a. Additionally, the radiation dose of β-ray can be measured by subtracting the radiation dose detected at the cathode electrode 121a from the radiation dose detected at the cathode electrode 121b.

Furthermore, with the use of the Geiger-Muller counter tube 310a, a radiation measurement apparatus, where removal/mounting of the shielding portion 216 can be freely performed, can be formed, similar to the radiation measurement apparatus 200 illustrated in FIG. 9B.

[Configuration of Geiger-Muller Counter 410]

Figure 11A:
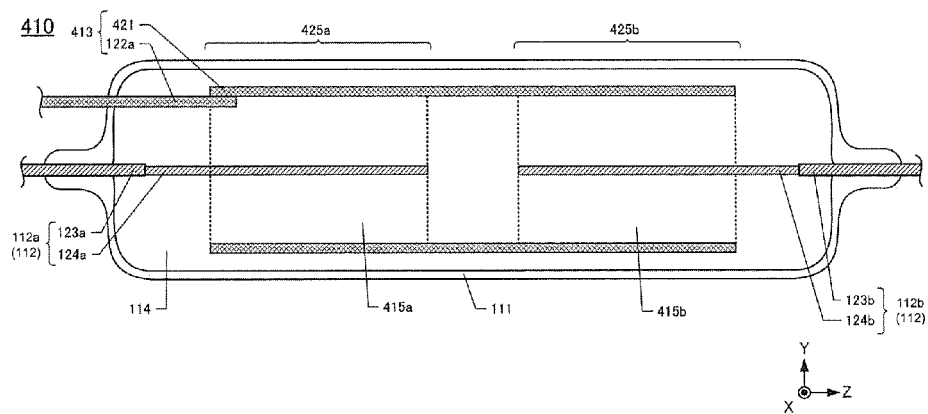
FIG. 11A is a cross-sectional view of a Geiger-Muller counter tube 410.

FIG. 11A is a cross-sectional view illustrating the Geiger-Muller counter tube 410. The Geiger-Muller counter tube 410 is constituted of the enclosing tube 111, the anode conductor 112, and a cathode conductor 413.

The cathode conductor 413 is constituted of a cathode electrode 421 and the second metal lead portion 122a. The second metal lead portion 122a passes through the end of the −Z-axis side of the enclosing tube 111 and holds the cathode electrode 421. The cathode electrode 421 is arranged so as to extend in the Z-axis direction in the space 114. The cathode electrode 421 extends from near the end of the −Z-axis side to near the end of the +Z-axis side in the space 114. Further, in the cathode electrode 421, for example, the slit 852 is formed as illustrated in FIG. 1B.

The anode conductor 112 is constituted of the first anode conductor 112a and the second anode conductor 112b, similar to the Geiger-Muller counter tube 110 illustrated in FIG. 7A. Both the anode electrode 124a of the first anode conductor 112a and the anode electrode 124b of the second anode conductor 112b are arranged on the central axis of the cathode electrode 421.

In the Geiger-Muller counter tube 410, assume that the portion where the cathode electrode 421 and the anode electrode 124a are overlapped in the XY plane is a first radiation detecting unit 425a. Further, assume that the portion where the cathode electrode 421 and the anode electrode 124b are overlapped in the XY plane is a second radiation detecting unit 425b. In addition, assume that the space where the first radiation detecting unit 425a detects the radiation is a space 415a and the space where the second radiation detecting unit 425b detects the radiation is a space 415b.

In the Geiger-Muller counter tube 410, the total radiation dose of the first radiation detecting unit 425a and the second radiation detecting unit 425b is detected by the cathode electrode 421. Additionally, the total radiation dose of β-ray and γ-ray at the first radiation detecting unit 425a can be detected by the anode electrode 124a, and the total radiation dose of β-ray and γ-ray at the second radiation detecting unit 425b can be detected by the anode electrode 124b. Furthermore, in the Geiger-Muller counter tube 410, despite the capability of performing such a plurality of the radiation-dose-measurement simultaneously, assembly of the Geiger-Muller counter tube 410 is facilitated because the usage of the cathode electrode 421 is one.

[Configuration of Geiger-Muller Counter 410a]

Figure 11B:
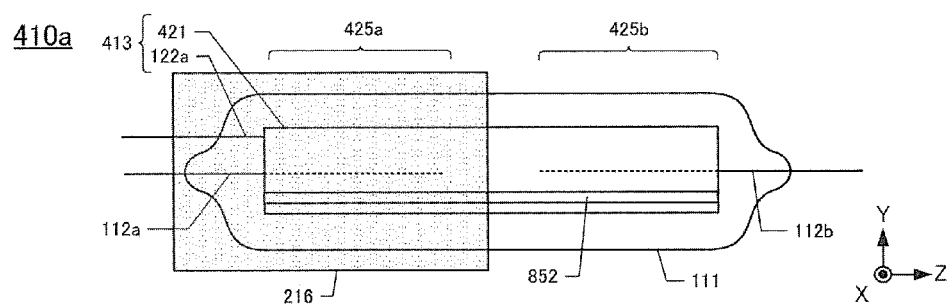

FIG. 11B is a schematic a cross-sectional view illustrating the Geiger-Muller counter tube 410a. The Geiger-Muller counter tube 410a is constituted of the Geiger-Muller counter tube 410 and the shielding portion 216 that covers the first radiation detecting unit 425a of the Geiger-Muller counter tube 410.

In the first radiation detecting unit 425a, only γ-ray is detected. Therefore, the radiation dose of γ-ray can be detected by measuring the pulse signal observed at the anode electrode 124a. Additionally, the radiation dose of β-ray can be measured by subtracting the radiation dose detected at the anode electrode 124a from the radiation dose detected at the anode electrode 124b.

Furthermore, with the use of the Geiger-Muller counter tube 410a, a radiation measurement apparatus, where removal/mounting of the shielding portion 216 can be freely performed, can be formed, similar to the radiation measurement apparatus 200 illustrated in FIG. 9B.

[Sixth Embodiment]

In the radiation measurement apparatus 100, the first radiation detecting unit 125a and the second radiation detecting unit 125b are connected to the first high-voltage circuit unit 130a and the second high-voltage circuit unit 130b respectively. However, the first radiation detecting unit 125a and the second radiation detecting unit 125b may be connected to one high-voltage circuit unit together. The following description describes the radiation measurement apparatus that includes a plurality of radiation measurement units and one high-voltage circuit unit. Additionally, like reference numerals designate corresponding or identical elements throughout from the third embodiment to and the fifth embodiment, and therefore such elements will not be further elaborated here.

[Configuration of Radiation Measurement Apparatus 500]

Figure 12:
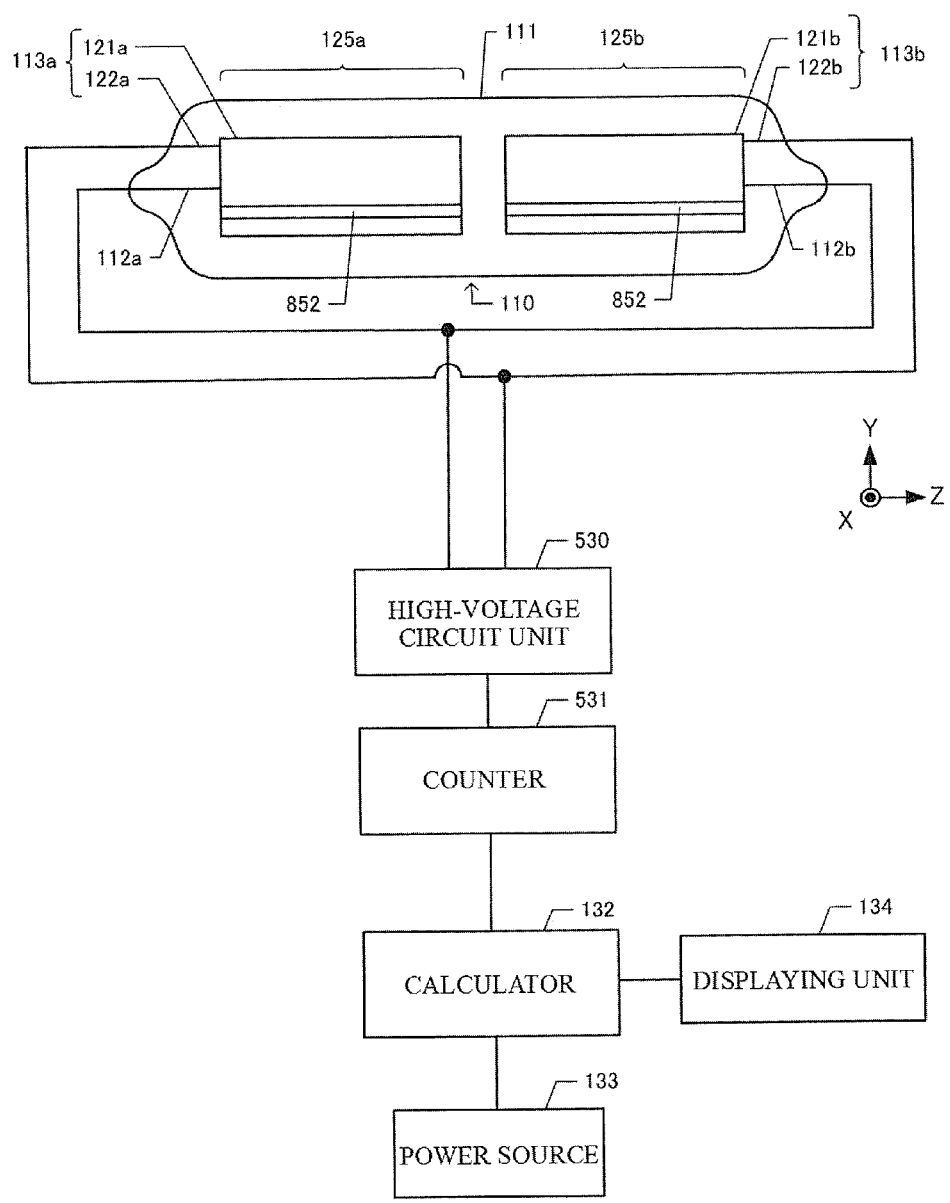
FIG. 12 is a schematic configuration diagram of a radiation measurement apparatus 500.

FIG. 12 is a schematic configuration diagram of the radiation measurement apparatus 500. The radiation measurement apparatus 500 is constituted including the Geiger-Muller counter tube 110, a high-voltage circuit unit 530, a counter 531, the calculator 132, the displaying unit 134, and the power source 133. The high-voltage circuit unit 530 has similar performance with the first high-voltage circuit unit 130a and the second high-voltage circuit unit 130b. The counter 531 has similar performance with the first counter 131a and the second counter 131b.

The first anode conductor 112a and the second anode conductor 112b of the Geiger-Muller counter tube 110 are connected together, and connected to the high-voltage circuit unit 530. In addition, the first cathode conductor 113a and the second cathode conductor 113b are connected together, and connected to the high-voltage circuit unit 530. That is, the first radiation detecting unit 125a and the second radiation detecting unit 125b are connected in parallel with respect to the high-voltage circuit unit 530

The counter 531 is connected to the high-voltage circuit unit 530, and the pulse signals detected by the first radiation detecting unit 125a and the second radiation detecting unit 125b are counted by the counter 531. That is, in the counter 531, the total of the pulse signals detected by the first radiation detecting unit 125a and the second radiation detecting unit 125b is detected. The calculator 132 is connected to the counter 531, and the power source 133 and the displaying unit 134 is connected to the calculator 132.

Figure 13:
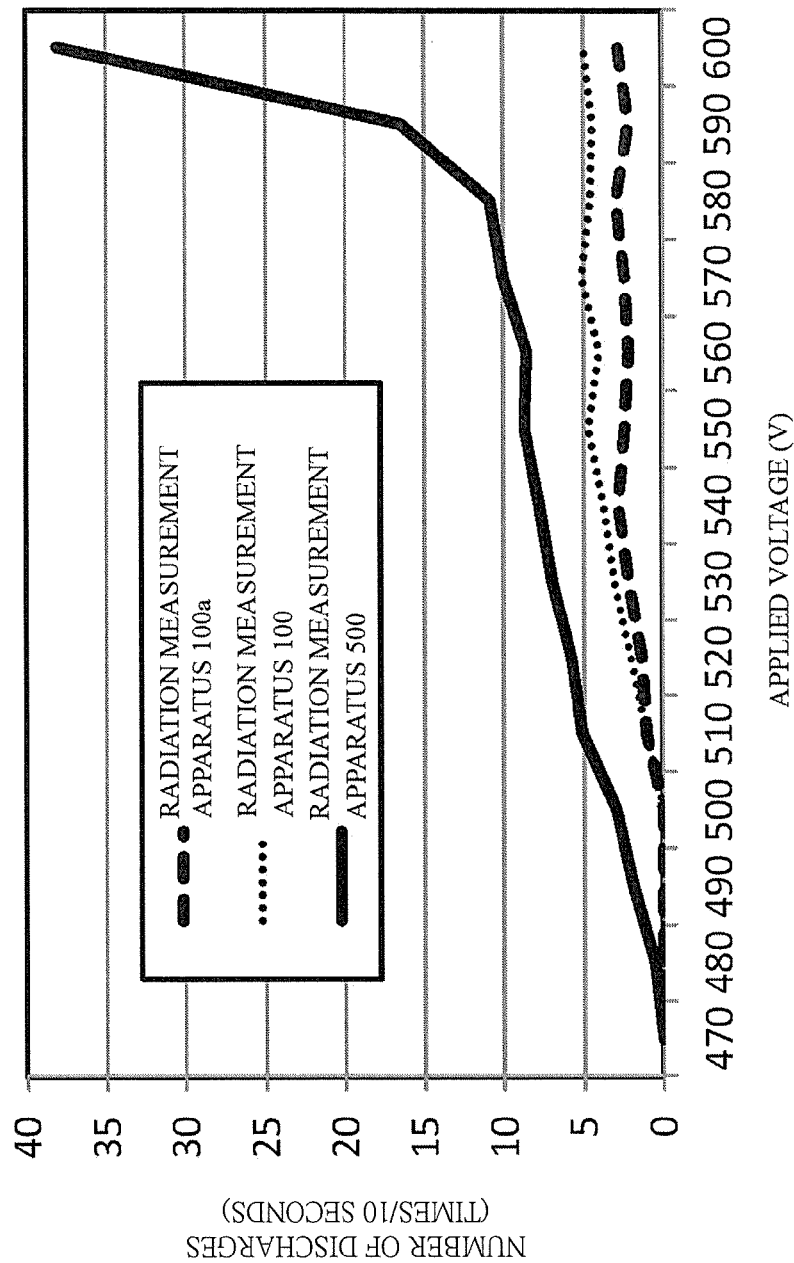
FIG. 13 is a graph that compares the number of discharges of radiation measurement apparatuses.

FIG. 13 is a graph that compares the number of discharges of radiation measurement apparatuses. In FIG. 13, the relationship between the number of discharges of the three radiation measurement apparatuses and applied voltages is illustrated. The three radiation measurement apparatuses include the radiation measurement apparatus 500 (see FIG. 12), the radiation measurement apparatus 100 (see FIG. 8), and a radiation measurement apparatus 100a. The radiation measurement apparatus 100a is the radiation measurement apparatus where, in the radiation measurement apparatus 100 (see FIG. 8), the electrode of the second radiation detecting unit 125b is opened to perform the measurement with the first radiation detecting unit 125a alone. The vertical axis of FIG. 13 denotes the number of discharges of the entire Geiger-Muller counter tube of each radiation measurement apparatus. The number of discharges is denoted as the number of discharges per ten seconds. Further, the horizontal axis of FIG. 13 denotes the magnitude of the applied voltages that are applied between the anode electrode and the cathode electrode of the Geiger-Muller counter tube. The applied voltage is DC voltage, and a unit is volt (V).

In FIG. 13, the number of discharges of the radiation measurement apparatus 100a increases between 500V to 530V in applied voltage and stabilizes when the applied voltage becomes larger than 530V. The number of discharges of the radiation measurement apparatus 100 increases between 500V to 540V in applied voltage and stabilizes when the applied voltage becomes larger than 540V. In the radiation measurement apparatus 500, the number of discharges increases between 480V to 510V in applied voltage. Further, the number of discharges increases gradually between 510V to 580V in applied voltage and increases significantly when the applied voltage becomes larger than 580V.

For the comparison of each radiation measurement apparatus, the number of discharges is compared when the applied voltage is 550V. The results of the number of discharges of each radiation measurement apparatus are as follows; 2.4 times/ten seconds in the radiation measurement apparatus 100a, 4.7 times/ten seconds in the radiation measurement apparatus 100, 8.7 times/ten seconds in the radiation measurement apparatus 500. In this case, the radiation measurement apparatus 100 detects about two times as many as the pulse signal with respect to the radiation measurement apparatus 100a. Further, the radiation measurement apparatus 500 detects about 1.9 times as many as the pulse signal with respect to the radiation measurement apparatus 100, and about 3.6 times as many as the pulse signal with respect to the radiation measurement apparatus 100a. That is, among the three radiation measurement apparatuses illustrated in FIG. 13, the radiation-detection sensitivity of the radiation measurement apparatus 100a is the lowest and that of the radiation measurement apparatus 500 is the highest.

The main difference between the radiation measurement apparatus 100 and radiation measurement apparatus 500 is the number of usage of the high-voltage circuit unit and the counter. Therefore, the difference of the radiation-detection sensitivity between the radiation measurement apparatus 100 and radiation measurement apparatus 500 illustrated in FIG. 13 is very likely caused by the number of usage of the high-voltage circuit unit and the counter. Furthermore, because the counter only counts the pulse signal, it is very likely that the number of usage of the high-voltage circuit unit significantly affects the difference of the radiation-detection sensitivity.

As indicated in the radiation measurement apparatus 500 in FIG. 13, using one high-voltage circuit unit can increase the radiation-detection sensitivity compared to using a plurality of the high-voltage circuit units. Furthermore, in the radiation measurement apparatus 500, the number of usage of the high-voltage circuit unit and the counter is only one respectively. Thus, the number of components for the radiation measurement apparatus becomes fewer and manufacturing cost is lowered, which is preferred.

[Configuration of Radiation Measurement Apparatus 600]

Figure 14:
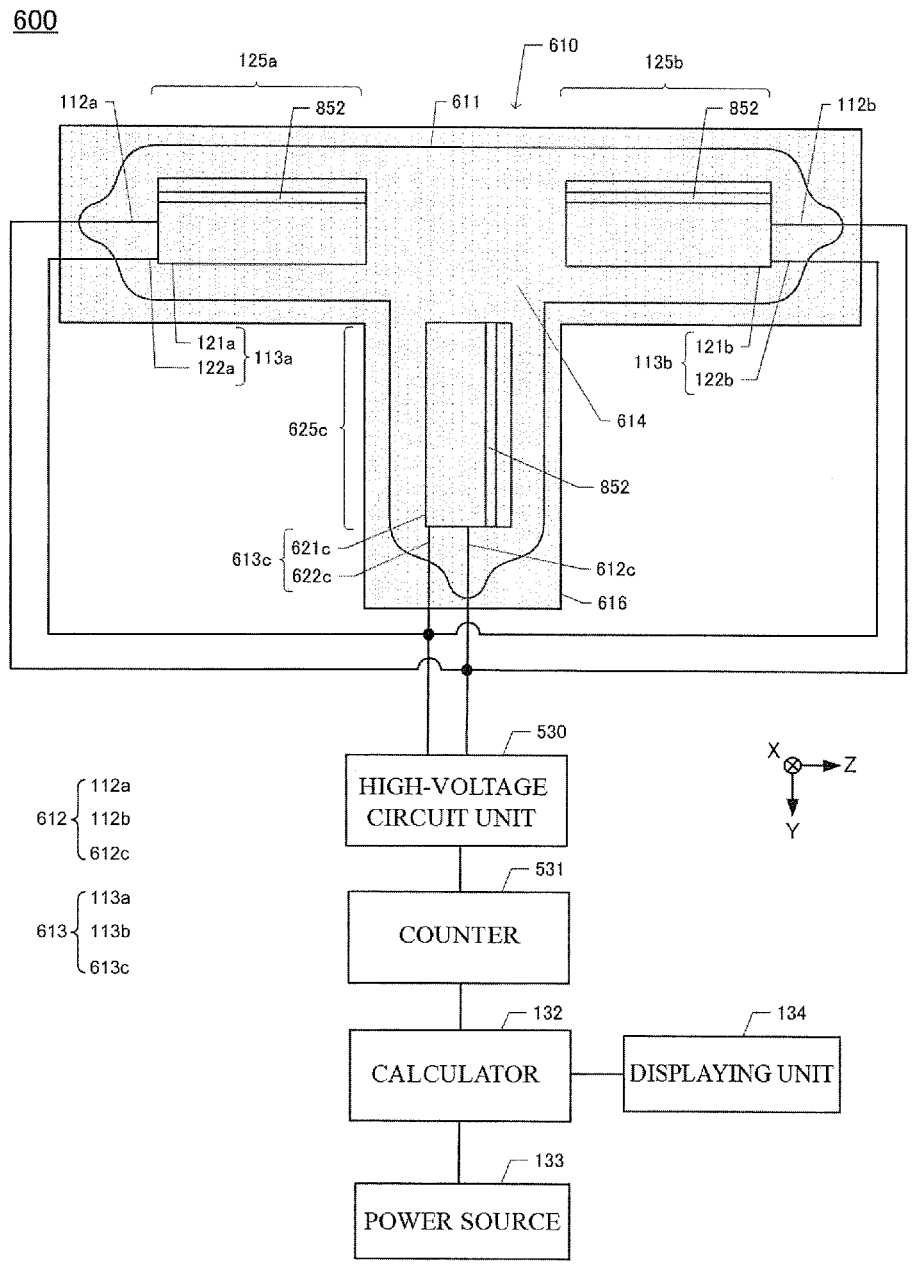
FIG. 14 is a schematic configuration diagram of a radiation measurement apparatus 600.

FIG. 14 is a schematic configuration diagram of the radiation measurement apparatus 600. The radiation measurement apparatus 600 is constituted including a Geiger-Muller counter tube 610, the high-voltage circuit unit 530, the counter 531, the calculator 132, the displaying unit 134, and the power source 133.

The Geiger-Muller counter tube 610 is constituted of an enclosing tube 611, an anode conductor 612, and a cathode conductor 613. In the enclosing tube 611, a cylindrical glass tube is formed so as to extend in the +Z-axis direction, −Z-axis direction, and +Y-axis direction respectively. A space 614 inside the enclosing tube 611 is sealed.

The anode conductor 612 is constituted of the first anode conductor 112a, the second anode conductor 112b, and a third anode conductor 612c. The third anode conductor 612c is constituted of the anode electrode (not illustrated), and the first metal lead portion (not illustrated), and is arranged in the space that extends in the +Y-axis direction in the enclosing tube 611. The third anode conductor 612c is formed in the same shape with the first anode conductor 112a and the second anode conductor 112b. The third anode conductor 612c is different from the first anode conductor 112a and the second anode conductor 112b only in an arrangement position inside the enclosing tube 611. The third anode conductor 612c is secured to the enclosing tube 611 by being supported at the end of the +Y-axis side of the enclosing tube 611.

The cathode conductor 613 is constituted of the first cathode conductor 113a, the second cathode conductor 113b, and a third cathode conductor 613c. The third cathode conductor 613c is constituted of a cathode electrode 621c and a second metal lead portion 622c, and is arranged in the space that extends in the +Y-axis direction in the enclosing tube 611. The third cathode conductor 613c has the same shape with the first cathode conductor 113a and the second cathode conductor 113b. The third cathode conductor 613c is different from the first cathode conductor 113a and the second cathode conductor 113b only in an arrangement position inside the enclosing tube 611. The third cathode conductor 613c is secured to the enclosing tube 611 with the second metal lead portion 622c being supported at the end of the +Y-axis side of the enclosing tube 611.

The Geiger-Muller counter tube 610 includes a third radiation detecting unit 625c that is constituted of the third anode conductor 612c and the third cathode conductor 613c together with the first radiation detecting unit 125a and the second radiation detecting unit 125b. The third radiation detecting unit 625c is the radiation detecting unit that is formed in the similar shape with the first radiation detecting unit 125a and the second radiation detecting unit 125b. The third radiation detecting unit 625c is different from the first radiation detecting unit 125a and the second radiation detecting unit 125b only in an arrangement position inside the enclosing tube 611.

In the radiation measurement apparatus 600, the first cathode conductor 113a, the second cathode conductor 113b, and the third cathode conductor 613c of the Geiger-Muller counter tube 610 are electrically connected together and are connected to the high-voltage circuit unit 530. Further, the first anode conductor 112a, the second anode conductor 112b, and the third anode conductor 612c are electrically connected together and are connected to the high-voltage circuit unit 530. That is, the first radiation detecting unit 125a, the second radiation detecting unit 125b, and the third radiation detecting unit 625c are connected in parallel with respect to the high-voltage circuit unit 530.

The counter 531 is connected to the high-voltage circuit unit 530. The pulse signals detected by the first radiation detecting unit 125a, the second radiation detecting unit 125b, and the third radiation detecting unit 625c are counted by the counter 531. That is, the counter 531 counts the total of the pulse signals detected by the first radiation detecting unit 125a, the second radiation detecting unit 125b, and the third radiation detecting unit 625c. The calculator 132 is connected to the counter 531, and the power source 133 and the displaying unit 134 is connected to the calculator 132.

In the radiation measurement apparatus 600, as illustrated in FIG. 14, a shielding portion 616, which blocks β-ray, can be mounted to the enclosing tube 611 so as to surround the enclosing tube 611 from the outside. Thus, the radiation measurement apparatus 600 can measure both β-ray and γ-ray. This measurement, for example, can be performed as follows; the total value of β-ray and γ-ray is measured by performing the measurement without mounting the shielding portion 616, further the value of γ-ray is measured by performing the measurement with mounting the shielding portion 616, and then the value of β-ray is calculated by subtracting the value of γ-ray from the total value of β-ray and γ-ray.

In the radiation measurement apparatus 600, the radiation-detection sensitivity becomes higher than the radiation measurement apparatus 500 due to including the three radiation detecting units. In addition, with the use of the shielding portion 616, each value of β-ray and γ-ray can be measured. In the radiation measurement apparatus 600, instead of measuring β-ray and γ-ray simultaneously, β-ray can be measured with high radiation-detection sensitivity due to the high radiation-detection sensitivity of the radiation measurement apparatus itself.

[Configuration of Radiation Measurement Apparatus 700]

Figure 15:
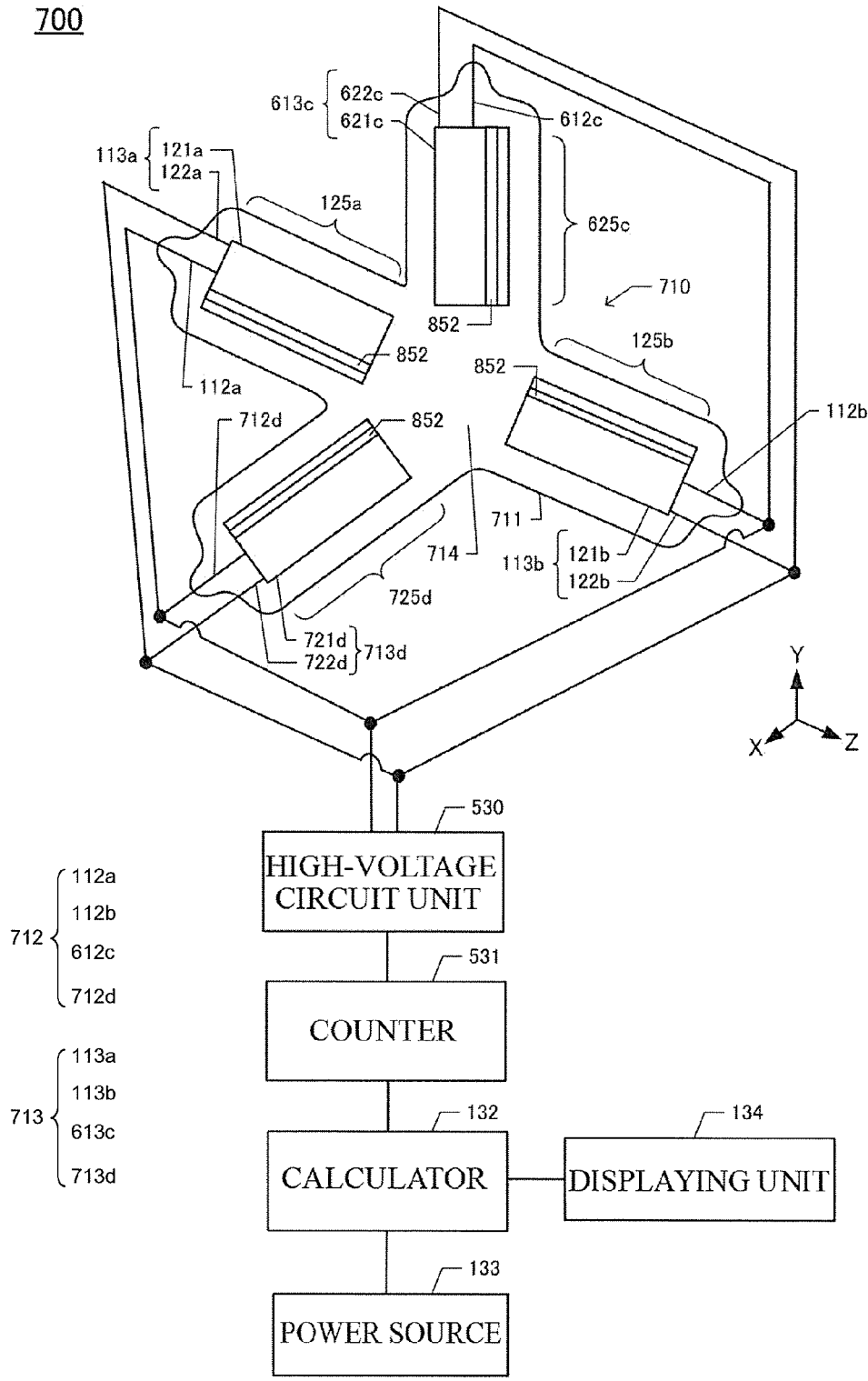
FIG. 15 is a schematic configuration diagram of a radiation measurement apparatus 700.

FIG. 15 is a schematic configuration diagram of the radiation measurement apparatus 700. The radiation measurement apparatus 700 is constituted including a Geiger-Muller counter tube 710, the high-voltage circuit unit 530, the counter 531, the calculator 132, the displaying unit 134, and the power source 133.

The Geiger-Muller counter tube 710 is constituted of an enclosing tube 711, an anode conductor 712, and a cathode conductor 713. In the enclosing tube 711, a cylindrical glass tube is formed so as to extend in the +Z-axis direction, −Z-axis direction, +Y-axis direction, and +X-axis direction respectively. A space 714 inside the enclosing tube 711 is sealed.

The anode conductor 712 is constituted of the first anode conductor 112a, the second anode conductor 112b, the third anode conductor 612c, and a fourth anode conductor 712d. The fourth anode conductor 712d is constituted of the anode electrode (not illustrated), and the first metal lead portion (not illustrated), and is arranged inside a space that extends in the +X-axis direction in the enclosing tube 711. The fourth anode conductor 712d has the same shape with the first anode conductor 112a and the second anode conductor 112b. The fourth anode conductor 712d is different from the first anode conductor 112a and the second anode conductor 112b only in an arrangement position inside the enclosing tube 711. The fourth anode conductor 712d is secured to the enclosing tube 711 by being supported at the end of the +X-axis side of the enclosing tube 711.

The cathode conductor 713 is constituted of the first cathode conductor 113a, the second cathode conductor 113b, the third cathode conductor 613c, and a fourth cathode conductor 713d. The fourth cathode conductor 713d is constituted of a cathode electrode 721d and a second metal lead portion 722d, and is arranged inside the space that extends in the +X-axis direction in the enclosing tube 711. The fourth cathode conductor 713d has the same shape with the first cathode conductor 113a and the second cathode conductor 113b. The fourth cathode conductor 713d is different from the first cathode conductor 113a and the second cathode conductor 113b only in an arrangement position inside the enclosing tube 711. The fourth cathode conductor 713d is secured to the enclosing tube 711 with the second metal lead portion 722d being supported at the end of the +X-axis side of the enclosing tube 711.

The Geiger-Muller counter tube 710 includes a fourth radiation detecting unit 725d that is constituted of the fourth anode conductor 712d and the fourth cathode conductor 713d together with the first radiation detecting unit 125a, the second radiation detecting unit 125b, and the third radiation detecting unit 625c. The fourth radiation detecting unit 725d is the radiation detecting unit that is formed in the similar shape with the first radiation detecting unit 125a and the second radiation detecting unit 125b. The fourth radiation detecting unit 725d is different from the first radiation detecting unit 125a and the second radiation detecting unit 125b only in an arrangement position inside the enclosing tube 711.

In the radiation measurement apparatus 700, the radiation-detection sensitivity becomes higher than the radiation measurement apparatus 500 and 600 due to including four radiation detecting units. In addition, similar to the radiation measurement apparatus 600, each value of β-ray and γ-ray can be measured by covering the Geiger-Muller counter tube 710 with the shielding portion (not illustrated).

The disclosure may be configured as follows. In the Geiger-Muller counter tube according to the first aspect, the Geiger-Muller counter tube according to a second aspect may be configured as follows. The cathode electrode is formed in a cylindrical shape with a rectangular metal sheet. The pair of sides of the metal sheet face to be separately spaced. The through-hole is a slit formed where the pair of sides of the metal sheet face to be separately spaced.

In the Geiger-Muller counter tube according to the first aspect, the Geiger-Muller counter tube according to a third aspect may be configured as follows. The cathode electrode is formed in a cylindrical shape with a metal sheet having the through-hole.

In the Geiger-Muller counter tube according to first aspect, the Geiger-Muller counter tube according to a fourth aspect may be configured as follows. The cathode electrode is formed of a pair of metal frames and a plurality of metal rods. The pair of the metal frames are arranged facing one another. The plurality of metal rods are arranged so as to connect the pair of the metal frames together. The through-holes are formed as gaps between the plurality of metal rods.

In the Geiger-Muller counter tube according to the first aspect, the Geiger-Muller counter tube according to a fifth aspect may be configured as follows. The cathode electrode is formed with a metal mesh rolled into a cylindrical shape. The metal mesh is interwoven into a mesh with a plurality of metal wire materials. The metal mesh has a mesh pattern forming the through-holes.

A radiation measurement apparatus according to a sixth aspect includes the Geiger-Muller counter tube according to any one of the first to fifth, one high-voltage circuit unit, a counter, and a calculator. The one single high-voltage circuit unit applies a predetermined high voltage between the first metal lead portion and a second metal lead portion. The counter is connected to the high-voltage circuit unit and counting pulse signals measured by the Geiger-Muller counter tube. The calculator converts the pulse signal counted by the counter into a radiation dose.

The Geiger-Muller counter tube and the radiation measurement apparatus according to this disclosure ensure to properly keep the degree of uniformity of the gas inside the Geiger-Muller counter tube.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A Geiger-Muller counter tube, comprising:
an enclosing tube that is at least partially cylindrical and has a space which is sealed;
an anode conductor, including an anode electrode and a linear first metal lead portion, the anode electrode being arranged inside the space and formed in a rod shape, the first metal lead portion being connected to the anode electrode and supported at an end of the enclosing tube;
a cathode conductor, including a cathode electrode in a cylindrical shape and a linear second metal lead portion, the cathode electrode surrounding a peripheral area of the anode electrode inside the space, the second metal lead portion being connected to the cathode electrode and supported at the end of the enclosing tube; and an inert gas and a quenching gas, being sealed inside the space, wherein the cathode electrode has a side surface through a part of which a through-hole passes;

wherein the cathode electrode is formed in a cylindrical shape with a rectangular metal sheet, and a pair of sides of the metal sheet facing to be separately spaced, and the through-hole is a slit formed where the pair of sides of the metal sheet face to be separately spaced.

2. A radiation measurement apparatus, comprising:

the Geiger-Muller counter tube according to claim 1;

one single high-voltage circuit unit that applies a predetermined high voltage between the first metal lead portion and the second metal lead portion;

a counter, being connected to the high-voltage circuit unit, and the counter counting pulse signals measured by the Geiger-Muller counter tube; and a calculator that converts the pulse signal counted by the counter into a radiation dose.

3. A Geiger-Muller counter tube, comprising:

an enclosing tube that is at least partially cylindrical and has a space which is sealed;

an anode conductor, including an anode electrode and a linear first metal lead portion, the anode electrode being arranged inside the space and formed in a rod shape, the first metal lead portion being connected to the anode electrode and supported at an end of the enclosing tube;

a cathode conductor, including a cathode electrode in a cylindrical shape and a linear second metal lead portion, the cathode electrode surrounding a peripheral area of the anode electrode inside the space, the second metal lead portion being connected to the cathode electrode and supported at the end of the enclosing tube; and an inert gas and a quenching gas, being sealed inside the space, wherein the cathode electrode has a side surface through a part of which a through-hole passes;

wherein the cathode electrode is formed of a pair of metal frames and a plurality of metal rods, the pair of the metal frames being arranged facing one another, the plurality of metal rods being arranged so as to connect the pair of the metal frames together, and the through-holes are formed as gaps between the plurality of metal rods.

4. A radiation measurement apparatus, comprising:

the Geiger-Muller counter tube according to claim 3;

one single high-voltage circuit unit that applies a predetermined high voltage between the first metal lead portion and the second metal lead portion;

a counter, being connected to the high-voltage circuit unit, and the counter counting pulse signals measured by the Geiger-Muller counter tube; and a calculator that converts the pulse signal counted by the counter into a radiation dose.

5. A Geiger-Muller counter tube, comprising:

an enclosing tube that is at least partially cylindrical and has a space which is sealed;

an anode conductor, including an anode electrode and a linear first metal lead portion, the anode electrode being arranged inside the space and formed in a rod shape, the first metal lead portion being connected to the anode electrode and supported at an end of the enclosing tube;

a cathode conductor, including a cathode electrode in a cylindrical shape and a linear second metal lead portion, the cathode electrode surrounding a peripheral area of the anode electrode inside the space, the second metal lead portion being connected to the cathode electrode and supported at the end of the enclosing tube; and an inert gas and a quenching gas, being sealed inside the space, wherein the cathode electrode has a side surface through a part of which a through-hole passes;

wherein the cathode electrode includes N number of cylindrical cathode elements, the N number of cathode elements being mutually separated in an axis direction of the cylindrical enclosing tube to be electrically insulated, wherein N is an integer of two or more, the through-hole is formed between the plurality of the cathode elements, and the second metal lead portions are connected to the respective plurality of cathode elements.

6. The Geiger-Muller counter tube according to claim 5, wherein the N number of cathode elements are two cathode elements having a common axial center.

7. A radiation measurement apparatus, comprising:

the Geiger-Muller counter tube according to claim 6;

one single high-voltage circuit unit that applies a predetermined high voltage between the first metal lead portion and the second metal lead portion;

a counter, being connected to the high-voltage circuit unit, and the counter counting pulse signals measured by the Geiger-Muller counter tube; and a calculator that converts the pulse signal counted by the counter into a radiation dose.

8. The Geiger-Muller counter tube according to claim 5, wherein the N number of cathode elements include a plurality of cathode elements whose axial centers intersect with one another.

9. A radiation measurement apparatus, comprising:

the Geiger-Muller counter tube according to claim 8;

one single high-voltage circuit unit that applies a predetermined high voltage between the first metal lead portion and the second metal lead portion;

a counter, being connected to the high-voltage circuit unit, and the counter counting pulse signals measured by the Geiger-Muller counter tube; and a calculator that converts the pulse signal counted by the counter into a radiation dose.

10. The Geiger-Muller counter tube according to claim 5, wherein the anode electrode includes N number of anode elements, the N number of anode elements extending along the respective central axes of the N number of anode elements, and the N number anode elements are integrally connected.

11. A radiation measurement apparatus, comprising:

the Geiger-Muller counter tube according to claim 10;

one single high-voltage circuit unit that applies a predetermined high voltage between the first metal lead portion and the second metal lead portion;

a counter, being connected to the high-voltage circuit unit, and the counter counting pulse signals measured by the Geiger-Muller counter tube; and a calculator that converts the pulse signal counted by the counter into a radiation dose.

12. The Geiger-Muller counter tube according to claim 5, wherein
the anode electrode includes the N number of anode elements, the N number of anode elements extending along the respective central axes of the N number of anode elements, and
the N number of anode elements are mutually and electrically insulated.

13. A radiation measurement apparatus, comprising:
the Geiger-Muller counter tube according to claim 12;
one single high-voltage circuit unit that applies a predetermined high voltage between the first metal lead portion and the second metal lead portion;
a counter, being connected to the high-voltage circuit unit, and the counter counting pulse signals measured by the Geiger-Muller counter tube; and
a calculator that converts the pulse signal counted by the counter into a radiation dose.

14. A radiation measurement apparatus, comprising:
the Geiger-Muller counter tube according to claim 5;
one single high-voltage circuit unit that applies a predetermined high voltage between the first metal lead portion and the second metal lead portion;
a counter, being connected to the high-voltage circuit unit, and the counter counting pulse signals measured by the Geiger-Muller counter tube; and
a calculator that converts the pulse signal counted by the counter into a radiation dose.

* * * * *